US011118826B2

(12) United States Patent
Hong et al.

(10) Patent No.: US 11,118,826 B2
(45) Date of Patent: Sep. 14, 2021

(54) REFRIGERATOR

(71) Applicant: Samsung Electronics Co., Ltd., Suwon-si (KR)

(72) Inventors: Chang Uo Hong, Hwaseong-si (KR); Jae Koog An, Gwangju (KR); Min Seob Yook, Suwon-si (KR); Moon Gyo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/858,118

(22) Filed: Dec. 29, 2017

(65) Prior Publication Data
US 2018/0187942 A1 Jul. 5, 2018

(30) Foreign Application Priority Data
Dec. 29, 2016 (KR) .................. 10-2016-0182069

(51) Int. Cl.
| F25C 5/182 | (2018.01) |
| F25D 23/06 | (2006.01) |
| F25D 23/04 | (2006.01) |
| F25D 11/02 | (2006.01) |
| F25D 23/08 | (2006.01) |

(52) U.S. Cl.
CPC .............. *F25C 5/182* (2013.01); *F25D 11/02* (2013.01); *F25D 23/04* (2013.01); *F25D 23/062* (2013.01); *F25D 23/087* (2013.01); F25C 2400/10 (2013.01); Y02B 40/00 (2013.01)

(58) Field of Classification Search
CPC ........ F25D 23/04; F25D 23/08; F25D 23/066; F25D 23/087

USPC ..................................... 62/344, 449
See application file for complete search history.

(56) References Cited

U.S. PATENT DOCUMENTS

| 9,341,402 B1 | 5/2016 | Loudermilk et al. |
| 2006/0260346 A1* | 11/2006 | Coulter ..................... F25C 5/24 |
| | | 62/340 |
| 2010/0101257 A1 | 4/2010 | Lee et al. |
| 2010/0257889 A1* | 10/2010 | Lee ......................... F25C 5/182 |
| | | 62/344 |
| 2011/0146326 A1* | 6/2011 | Choi ........................ F25C 5/22 |
| | | 62/344 |

(Continued)

FOREIGN PATENT DOCUMENTS

| CN | 1031414 A | 3/1989 |
| CN | 1880900 A | 12/2006 |

(Continued)

OTHER PUBLICATIONS

European Search Report dated May 24, 2018 in connection with European Patent Application No. 17 21 0027.

(Continued)

*Primary Examiner* — Jianying C Atkisson
*Assistant Examiner* — Meraj A Shaikh

(57) ABSTRACT

Disclosed herein is a refrigerator. The refrigerator includes a main body including a storage compartment. The refrigerator also includes a door configured to open and close the storage compartment. The refrigerator further includes an ice-making compartment disposed in the storage compartment. The refrigerator also includes and a sealing member disposed at the door to apply a sealing force to the ice-making compartment when the door is closed.

16 Claims, 23 Drawing Sheets

(56) References Cited

U.S. PATENT DOCUMENTS

| | | | |
|---|---|---|---|
| 2011/0167862 A1 | 7/2011 | Shin et al. | |
| 2011/0271706 A1* | 11/2011 | Bowen | F25C 5/22 62/344 |
| 2012/0000234 A1 | 1/2012 | Adamski et al. | |
| 2012/0000238 A1 | 1/2012 | Tikhonov et al. | |
| 2012/0102997 A1 | 5/2012 | Oh et al. | |
| 2013/0167569 A1 | 7/2013 | Lee | |
| 2014/0000303 A1* | 1/2014 | Jeong | F25D 23/069 62/344 |
| 2014/0132142 A1* | 5/2014 | Kim | F25D 23/025 312/405 |
| 2014/0305156 A1 | 10/2014 | Lee et al. | |
| 2015/0061484 A1* | 3/2015 | Jeong | H01F 7/0205 312/404 |
| 2015/0135760 A1* | 5/2015 | Jeong | F25D 23/087 62/344 |
| 2016/0054044 A1* | 2/2016 | Jeong | F25C 1/00 62/66 |

FOREIGN PATENT DOCUMENTS

| | | |
|---|---|---|
| CN | 102455094 A | 5/2012 |
| CN | 105371551 A | 3/2016 |
| CN | 205192074 U | 4/2016 |
| EP | 2623907 A3 | 3/2015 |
| EP | 2988079 A2 | 2/2016 |
| KR | 10-2016-0023282 A | 3/2016 |
| KR | 10-2016-0035532 A | 3/2016 |
| KR | 10-2016-0041881 A | 4/2016 |
| KR | 10-1658667 B1 | 9/2016 |
| WO | 2016/0186374 A1 | 11/2016 |

OTHER PUBLICATIONS

European Patent Office, "Communication pursuant to Article 94(3) EPC," Application No. 17210027.3, dated Apr. 15, 2019, 6 pages.
The First Office Action in connection with Chinese Application No. 201711456488.9, dated Oct. 28, 2019, 17 pages.
Office Action dated Aug. 1, 2020 in connection with Korean Patent Application No. 10-2016-0182069, 13 pages.
Notice of Preliminary Rejection dated Feb. 1, 2021 in connection with Korean Application No. 10-2016-0182069, 16 pages.
Office Action dated Jun. 1, 2021 in connection with Korean Application No. 10-2016-0182069, 9 pages.

* cited by examiner

REFRIGERATOR

CROSS-REFERENCE TO RELATED APPLICATION AND CLAIM OF PRIORITY

This application is related to and claims priority to Korean Patent Application No. 10-2016-0182069, filed on Dec. 29, 2016, the contents of which are incorporated herein by reference.

TECHNICAL FIELD

Embodiments of the present disclosure relate to a refrigerator, and more particularly, to a refrigerator including an ice-making compartment with an improved structure.

BACKGROUND

Generally, a refrigerator is a household appliance capable of supplying cool air generated from an evaporator to a freezing compartment and a refrigerating compartment to maintain freshness of various foods for a long time.

Food that should be kept below a freezing temperature, such as meat, fish, ice cream and the like is stored in the freezing compartment, and food that should be kept above the freezing temperature, such as vegetables, fruit, drinks and the like is stored in the refrigerating compartment.

The refrigerator may include an ice-making device configured to produce and store ice. In the case of a bottom mounted freezer (BMF) type refrigerator, an ice-making compartment may be disposed at one corner inside the refrigerating compartment or at a rear surface of the refrigerating compartment door.

The ice-making compartment may include an ice maker configured to produce ice, and an ice bucket configured to store ice produced in the ice maker and transfer the ice to a dispenser.

SUMMARY

To address the above-discussed deficiencies, it is a primary object to provide a refrigerator including an ice-making compartment with an improved structure.

It is another aspect of the present disclosure to provide a refrigerator in which an insulating effect of an ice-making compartment can be improved.

It is still another aspect of the present disclosure to provide a refrigerator capable of forming a cool air inflow space at a rear surface of a door, into which cool air of an ice-making compartment flows to allow low temperature maintenance.

In accordance with one aspect of the present disclosure, a refrigerator includes a main body including a storage compartment; a door configured to open and close the storage compartment; an ice-making compartment disposed in the storage compartment; and a sealing member disposed at the door to apply a sealing force to the ice-making compartment when the door is closed.

The door may include a space formed at a position corresponding to the ice-making compartment, and the sealing member may be disposed between the space and the ice-making compartment.

The space may be recessed into the door.

The sealing member may be configured to seal between the space and the ice-making compartment when the door is closed.

The ice-making compartment may include: an ice-making housing disposed in the storage compartment; an ice maker configured to produce the ice; and an ice bucket configured to store the ice produced in the ice maker.

The ice-making housing may include an ice bucket mounting hole formed to allow the ice bucket to be introduced or withdrawn.

The ice-making compartment may include a cool air outlet formed between the ice bucket and the ice bucket mounting hole.

The sealing member may be configured to correspond to an outer side of the ice bucket mounting hole when the door is closed.

Cool air flowing out through the cool air outlet may flow into the space.

The door may include a refrigerating compartment door configured to open and close a refrigerating compartment in the storage compartment, and the space may be disposed in the refrigerating compartment door.

Cool air of the ice-making compartment may be moved to the space through the cool air outlet so that a temperature of the space is lower than the temperature of the refrigerating compartment.

The space may further include a cool air inflow housing. Further, the sealing member may be disposed at the cool air inflow housing.

The ice-making compartment may include: a first ice outlet formed in the ice-making housing; and a second ice outlet formed in the ice bucket to correspond to the first ice outlet.

The sealing member may be detachably mounted onto the cool air inflow housing.

In accordance with another aspect of the present disclosure, a refrigerator includes: a main body including a refrigerating compartment and a freezing compartment; a door configured to open and close the refrigerating compartment; an ice-making compartment disposed in the refrigerating compartment; an ice bucket configured to store ice produced in the ice-making compartment; a space disposed in the door to correspond to the ice-making compartment; and a sealing member disposed between the space and the ice-making compartment and configured to seal between the space and the ice-making compartment when the door is closed.

The space may be recessed into a rear side of the door.

The ice-making compartment may include a cool air outlet, and cool air flowing out through the cool air outlet may flow into the space.

The sealing member may be disposed to correspond to an outer side of the cool air outlet when the door is closed.

The sealing member may be disposed at an edge of the space.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
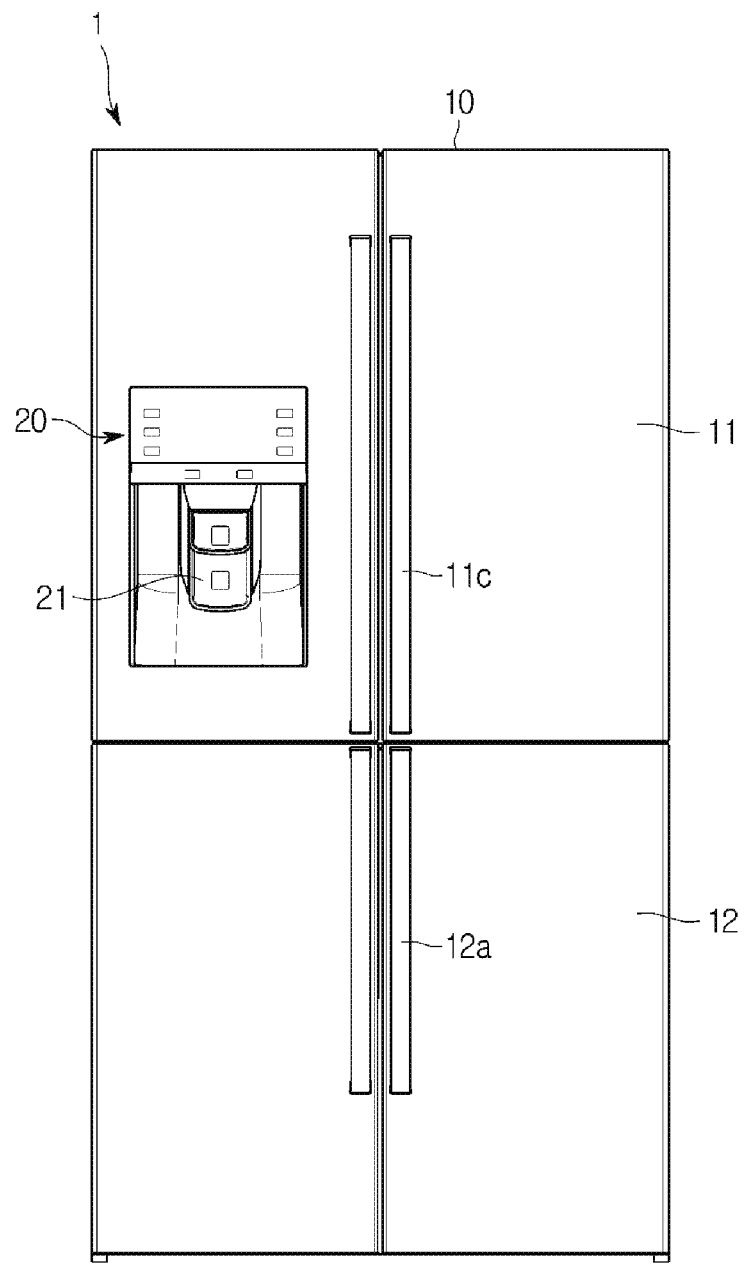
FIG. 1 illustrates a front view showing a refrigerator according to one embodiment of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments disclosed in the specification and components shown in the drawings are merely preferable examples of the present disclosure and various modifications capable of replacing the embodiments and drawings of the specification may be made at the time of filing the present application.

Also, throughout the drawings of the present specification, like reference numerals or symbols refer to components or elements configured to perform substantially identical functions.

Also, the terms used herein are to explain the embodiments but are not intended to limit and/or define the present disclosure. Singular forms, unless defined otherwise in context, include plural forms. Throughout the specification, the terms "comprise", "have", and the like are used herein to specify the presence of stated features, numbers, steps, operations, elements, components or combinations thereof but do not preclude the presence or addition of one or more other features, numbers, steps, operations, elements, components, or combinations thereof.

Also, even though the terms including ordinals such as "first", "second", and the like may be used for describing various components, the components will not be limited by the terms and the terms are used only for distinguishing one element from others. For example, without departing from the scope of the present disclosure, a first component may be referred to as a second component, and similarly, the second component may be referred to as the first component. The term "and/or" includes any and all combinations or one of a plurality of associated listed items.

Hereinafter, the embodiments will be described in detail with reference to the attached drawings.

As used below, a front side and a front refer to a direction facing a front side and a front of a refrigerator 1 shown in FIG. 1, and a rear refers to a direction facing a rear of the refrigerator 1.

Figure 2:
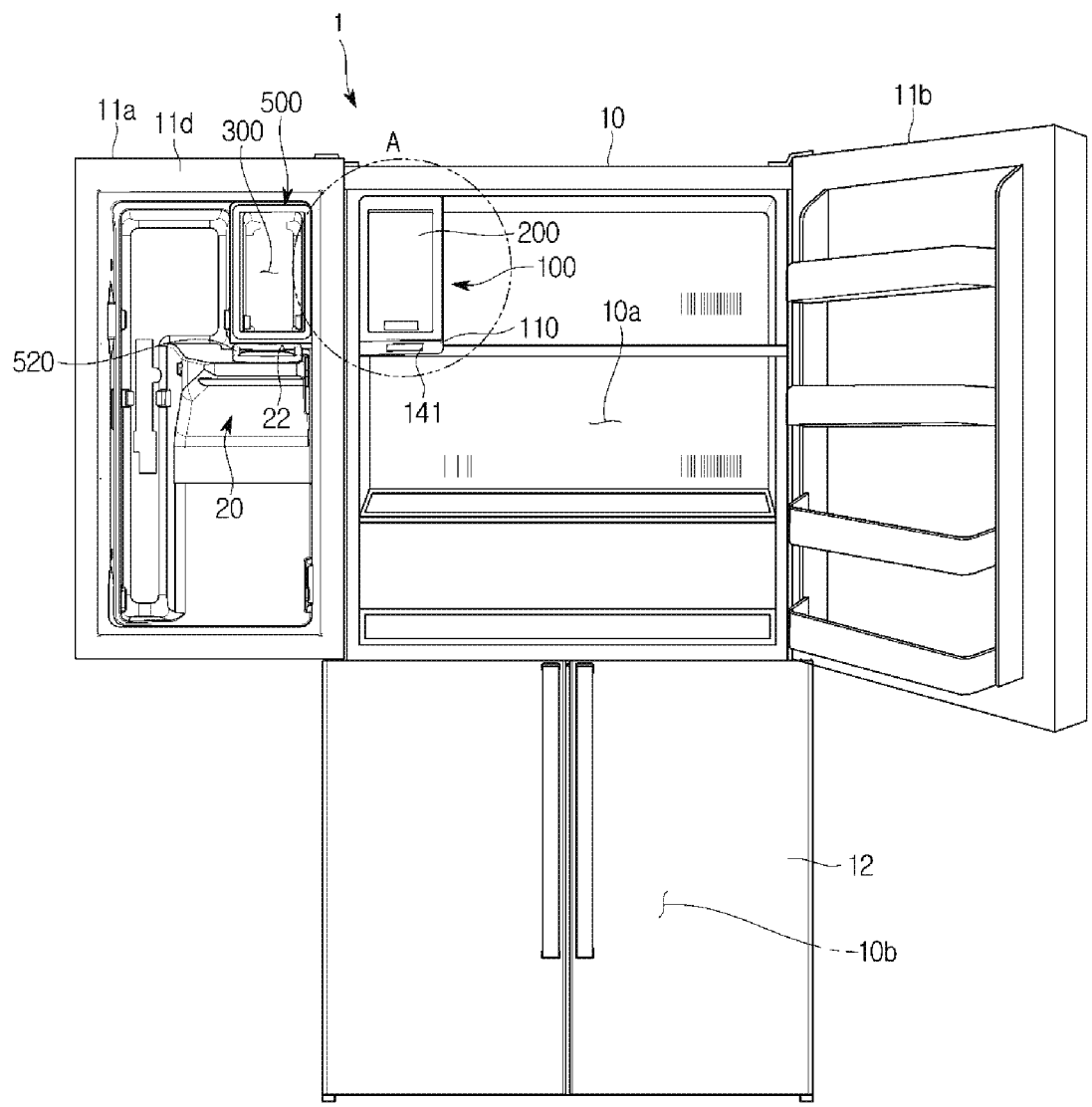
FIG. 2 illustrates a front view showing a refrigerating compartment of a refrigerator according to one embodiment of the present disclosure.
Figure 3:
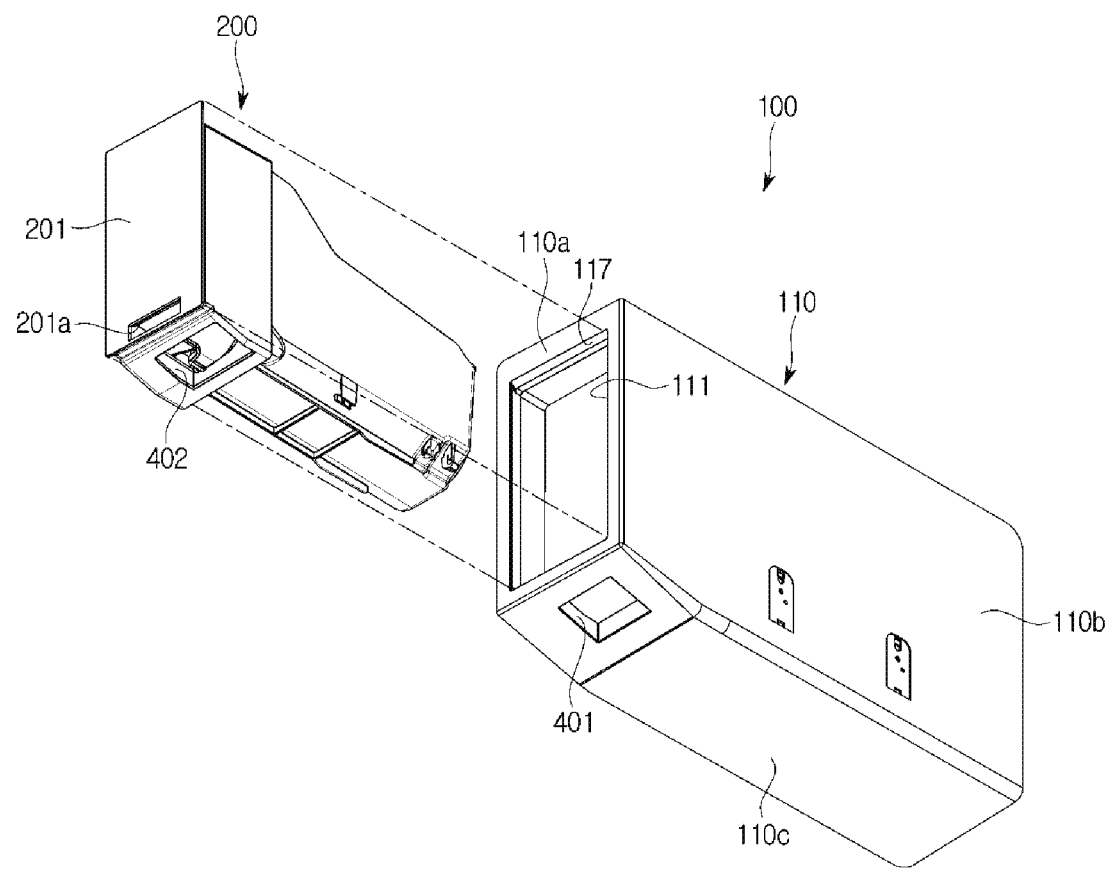
FIG. 3 illustrates an exploded perspective view showing an ice-making housing and an ice bucket in an ice-making compartment according to one embodiment of the present disclosure.
Figure 4:
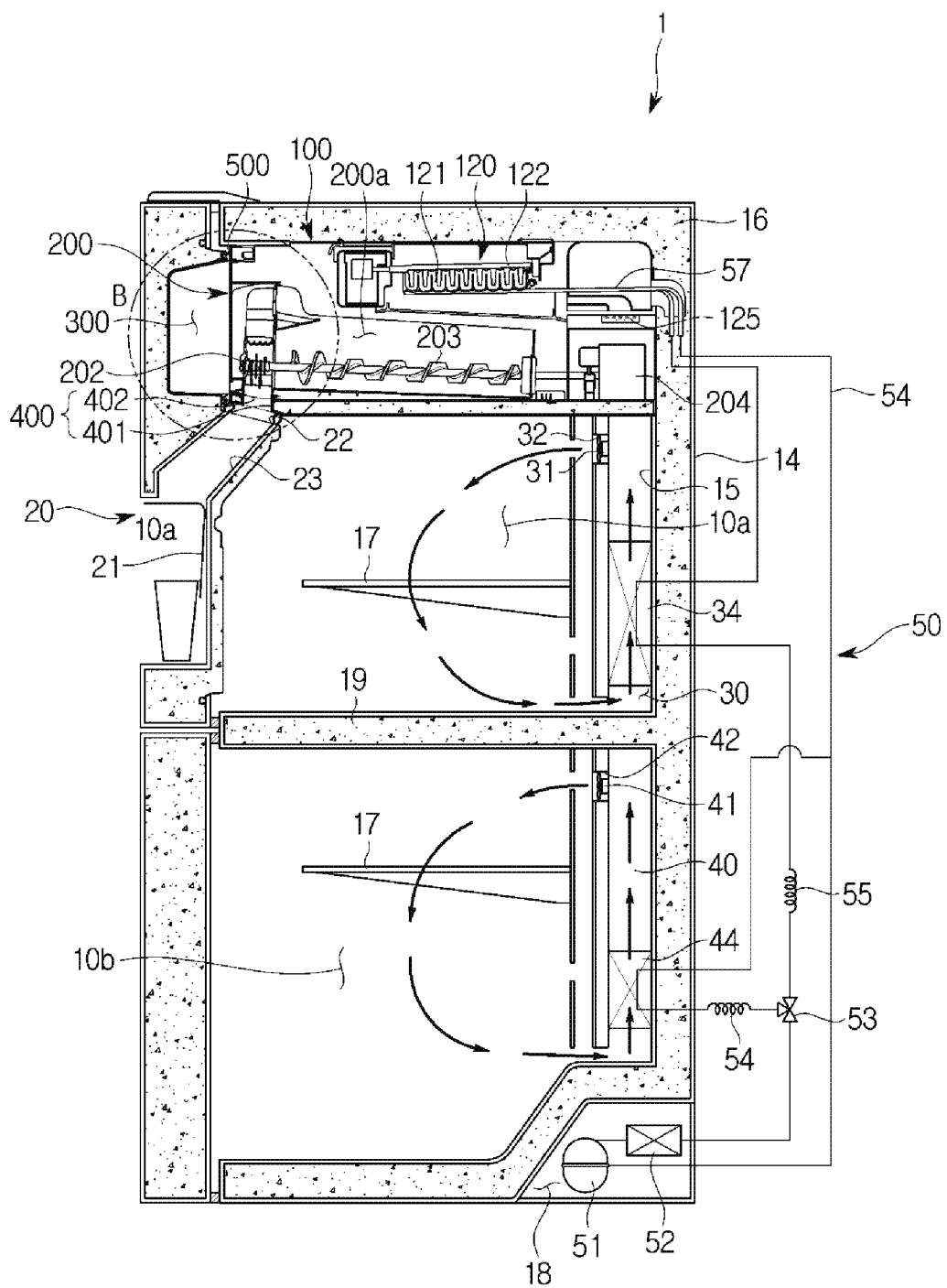
FIG. 4 illustrates a side sectional view of a refrigerator according to one embodiment of the present disclosure.
Figure 5:
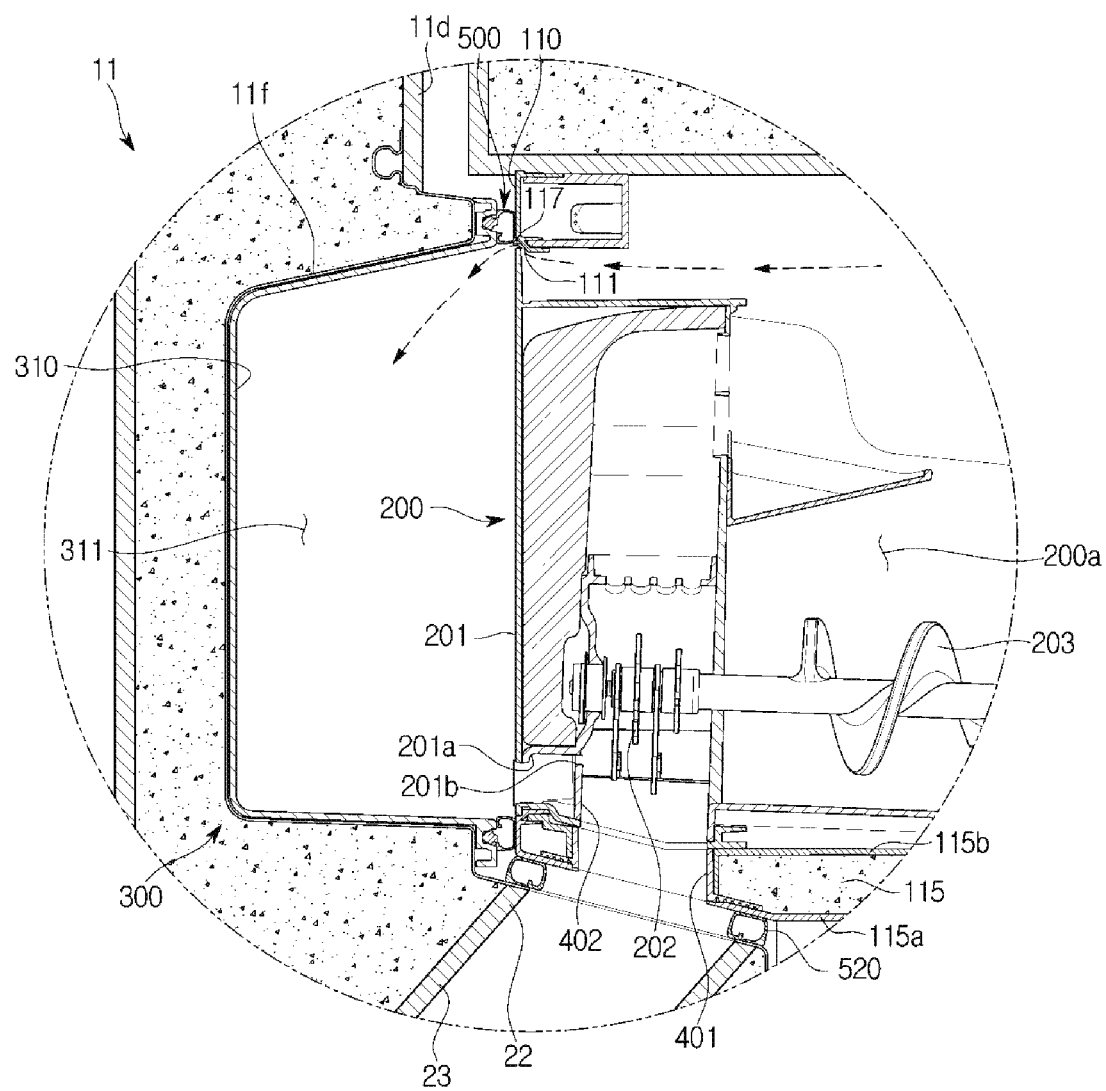
FIG. 5 illustrates an enlarged view of a portion B in FIG. 4 according to an embodiment of the present disclosure.
Figure 6:
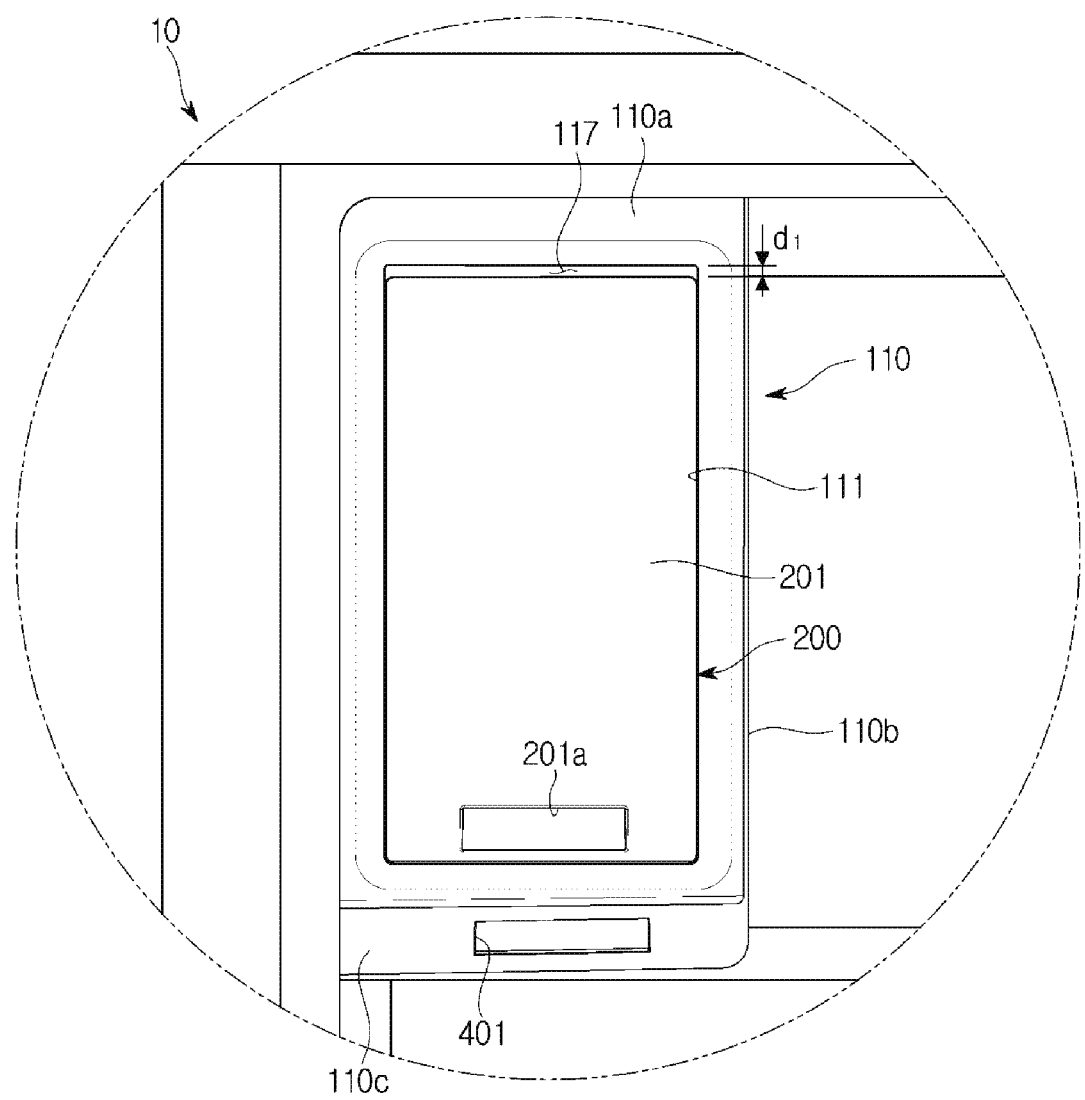
FIG. 6 illustrates an enlarged view of a portion A in FIG. 2 according to an embodiment of the present disclosure.

FIG. 1 illustrates a front view showing a refrigerator according to one embodiment of the present disclosure. FIG. 2 illustrates a front view showing a refrigerating compartment of a refrigerator according to one embodiment of the present disclosure. FIG. 3 i illustrates s an exploded perspective view showing an ice-making housing and an ice bucket in an ice-making compartment according to one embodiment of the present disclosure. FIG. 4 illustrates a side sectional view of a refrigerator according to one embodiment of the present disclosure. FIG. 5 illustrates an enlarged view of a portion B in FIG. 4 according to an embodiment of the present disclosure. FIG. 6 illustrates an enlarged view of a portion A in FIG. 2 according to an embodiment of the present disclosure.

As shown in FIGS. 1 to 6, a refrigerator 1 includes a main body 10 forming storage compartments 10a and 10b allowing refrigerating or freezing storage of foods, an ice-making compartment 100 capable of producing ice, and a cooling device 50 configured to supply cool air to the storage compartments 10a and 10b and ice-making compartment 100.

The main body 10 may include an inner case 15 forming the storage compartments 10a and 10b, an outer case 14 coupled to an outer surface of the inner case 15 to form an outer appearance, and an insulating material 16 foamed between the inner case 15 and the outer case 14.

The storage compartments 10a and 10b may have an opened front surface and may be partitioned into a refrigerating compartment 10a at an upper part and a freezing compartment 10b at a lower part by a partition 19. The partition 19 may include the insulating material 16 for blocking heat exchange between the refrigerating compartment 10a and the freezing compartment 10b.

A shelf 17 capable of having food placed thereon and partitioning a storage space of the refrigerating compartment 10a into an upper part and a lower part, may be disposed in the refrigerating compartment 10a.

An ice-making compartment 100 configured to produce ice may be installed in the refrigerating compartment 10a. The ice-making compartment 100 may be disposed in the storage compartment 10a or 10b inside the main body 10. The ice-making compartment 100 may be partitioned from the storage compartments 10a and 10b. The ice-making compartment 100 may be disposed at an upper part of one side of the refrigerating compartment 10a, and may be partitioned from the refrigerating compartment 10a by an ice-making housing 110.

The ice-making compartment 100 may include the ice-making housing 110 and an ice bucket 200. The ice-making compartment 100 may be disposed at an upper corner of one side of the refrigerating compartment 10a.

The ice-making housing 110 includes an ice maker 120 which will be described below. The ice maker 120 may be installed at an upper surface of the refrigerating compartment 10a. In the embodiment of the present disclosure, the ice maker 120 is disposed at the upper surface of the refrigerating compartment 10a, but the spirit of the present disclosure is not limited thereto. For example, the ice-making compartment may be mounted only on the upper surface of the refrigerating compartment, or may be disposed alone in the refrigerating compartment.

The ice bucket 200 configured to store ice produced by the ice maker 120 may be introduced into or withdrawn from the ice-making housing 110. The ice-making housing 110 may include an ice bucket mounting hole 111 formed to allow the ice bucket 200 to be introduced or withdrawn. The ice bucket mounting hole 111 may be disposed at a front panel 110a of the ice-making housing 110. The ice bucket mounting hole 111 may have a size and form corresponding to the ice bucket 200 so that the ice bucket 200 may be introduced or withdrawn.

The ice-making housing 110 may include the front panel 110a, a side panel 110b, and a bottom panel 110c. The ice-making housing 110 may be disposed at an upper part of one side of the refrigerating compartment 10a so that at least two surfaces of the inner case 15 of the refrigerating compartment 10a form remaining surfaces of the ice-making housing 110. A side surface and an upper surface of the inner case 15 of the refrigerating compartment 10a may form another side surface and an upper surface of the ice-making housing 110.

A first ice outlet 401 configured to move ice discharged through a second ice outlet 402 of the ice bucket 200 which will be described below to an extraction space, may be formed in the bottom panel 110c of the ice-making housing 110. The first ice outlet 401 of the ice-making housing 110 is formed at a position corresponding to the second ice outlet 402 of the ice bucket 200.

The ice bucket 200 may form an ice storage space 200a for storing ice. The ice bucket 200 includes an ice bucket cover 201 at a front and the second ice outlet 402 formed in a bottom surface thereof. The ice bucket cover 201 is formed to correspond to the ice bucket mounting hole 111 of the ice-making housing 110, and the ice-making housing 110 may be closed by the ice bucket cover 201.

Further, the opened front surface of the refrigerating compartment 10a may be hinge-coupled to the main body 10 to be openable and closable by a pair of rotatable refrigerating compartment doors 11.

The refrigerating compartment door 11 may include a dispenser 20 capable of extracting ice of the ice-making compartment 100 from the outside without opening the refrigerating compartment door 11. The dispenser 20 may include an ice inlet 22 through which ice is introduced, a lever 21 through which whether or not to extract ice may be selected, and a chute 23 configured to guide ice discharged through an ice outlet 400 of the ice-making compartment 100.

The opened front surface of the freezing compartment 10b may be hinge-coupled to the main body 10 to be openable and closable by a pair of rotatable freezing compartment doors 12. Each of the freezing compartment doors 12 may have a handle 11c so that a user may open and close the freezing compartment doors 12.

The refrigerating compartment door 11 may include a first door 11a disposed on a left side and a second door 11b disposed on a right side. The first door 11a and the second door 11b are opened by rotating in directions opposite to each other. In the embodiment of the present disclosure, since the dispenser and a cool air inflow chamber are disposed in the first door, the refrigerating compartment door is hereinafter referred to as the first door.

Further, the cooling device 50 may include a compressor 51 configured to compress a refrigerant to a high pressure; a condenser 52 configured to condense the compressed refrigerant; expansion devices 54 and 55 configured to expand a refrigerant to a low pressure; evaporators 34 and 44 configured to evaporate a refrigerant to generate cool air, and a refrigerant pipe 56 configured to guide a refrigerant.

The compressor 51 and the condenser 52 may be disposed in a machine space 18 positioned at a rear lower part of the main body 10. Moreover, the evaporators 34 and 44 may be disposed in a refrigerating compartment cool air supply duct 30 positioned in the refrigerating compartment 10a and a freezing compartment cool air supply duct 40 positioned in the freezing compartment 10b.

The refrigerating compartment cool air supply duct 30 may include an inlet 33, a cool air outlet 32, and a blower fan 31 so that cool air may be circulated in the refrigerating compartment 10a. Further, the freezing compartment cool air supply duct 40 may include an inlet 43, a cool air outlet 42, and a blower fan 41 so that cool air may be circulated in the freezing compartment 10b.

The refrigerant pipe 56 may be branched at one side so that a refrigerant may flow into the freezing compartment 10b or a refrigerant may flow into the refrigerating compartment 10a and the ice-making compartment 100, and may include a switching valve 53 capable of switching the flow path of the refrigerant at the branch point.

A portion 57 of the refrigerant pipe 56 may be disposed inside the ice-making compartment 100 to cool the ice-making compartment 100. The portion 57 of the refrigerant pipe 56 disposed inside the ice-making compartment 100 may come into contact with an ice-making tray 121 to directly supply cooling energy to the ice-making tray 121 in a thermal conduction manner.

The ice-making compartment 100 may be partitioned from the refrigerating compartment 10a by the ice-making housing 110. The bottom panel 110c and side panel 110b of the ice-making housing 110 may include an outer plate 115b and an inner plate 115a. An insulating material 115 may be disposed between the outer plate 115b and the inner plate 115a to prevent heat exchange between the ice-making compartment 100 and the refrigerating compartment 10a.

The first ice outlet 401 formed in the bottom panel 110c of the ice-making housing 110 may be formed at a position corresponding to the ice inlet 22 of the dispenser 20.

Accordingly, ice produced in the ice maker 120 may be discharged from the ice storage space 200a of the ice bucket 200 and may be moved to the dispenser 20 through the first ice outlet 401 of the ice-making housing 110.

The ice maker 120 includes the ice-making tray 121 configured to store ice-making water, an ejector 122 configured to separate ice in the ice-making tray 121, an ice-separating motor 123 configured to rotate the ejector 122, an ice-separating heater (not shown) configured to heat the ice-making tray 121 to facilitate separation of ice when the ice is separated from the ice-making tray 121, the ice bucket 200 configured to store ice produced in the ice-making tray 121, a drain duct 124 configured to collect defrosted water of the ice-making tray 121 and guide the flow path of air inside the ice-making compartment 100, and an ice-making compartment fan 125 configured to circulate air inside the ice-making compartment 100.

The ice-making tray 121 may be formed of a material such as aluminum having high thermal conductivity.

The ice bucket 200 may be disposed below the ice-making tray 121 to collect ice falling from the ice-making tray 121. The ice storage space 200a of the ice bucket 200 may include an auger 203 configured to transport the stored ice to the second ice outlet 402, an auger motor 204 configured to drive the auger 203, and a crushing device 202 capable of crushing ice.

The ice bucket 200 may be introduced or withdrawn through the ice bucket mounting hole 111 of the ice-making housing 110.

A handle 201a may be disposed on the front surface of the ice bucket 200. The handle 201a may be formed at a lower side of the ice bucket cover 201. The handle 201a may be formed by recessing at least a part of the ice bucket cover 201. The handle 201a of the ice bucket 200 is configured so that a user may easily withdraw the ice bucket 200 to a front of the ice-making housing 110.

Further, a cool air outlet 117 may be disposed between the ice bucket mounting hole 111 of the ice-making housing 110 and the ice bucket 200. The cool air outlet 117 may be formed between the ice-making housing 110 and the ice bucket 200. The cool air outlet 117 may be formed between the ice bucket mounting hole 111 and the ice bucket 200. The cool air outlet 117 may be formed at an upper end of the ice bucket mounting hole 111. The cool air outlet 117 may transfer cool air of the ice-making compartment 100 to a space 300 formed in the refrigerating compartment door 11, which will be described below.

Here, the handle 201a of the ice bucket 200 has a slit 201b through which cool air may pass. The slit 201b may be formed by cutting at least a part of an inner surface of the handle 201a. The cool air of the ice-making compartment 100 may be transferred to the space 300 formed in the refrigerating compartment door 11 through the slit 201b of the handle 201a.

A predetermined gap dl is formed between the ice bucket mounting hole 111 of the ice-making housing 110 and the upper end of the ice bucket 200. The cool air outlet 117 may be formed by the gap dl. The cool air outlet 117 may include the gap dl.

The cool air flowing out from the cool air outlet 117 may flow into the space 300 disposed in the refrigerating compartment door 11.

Figure 7:
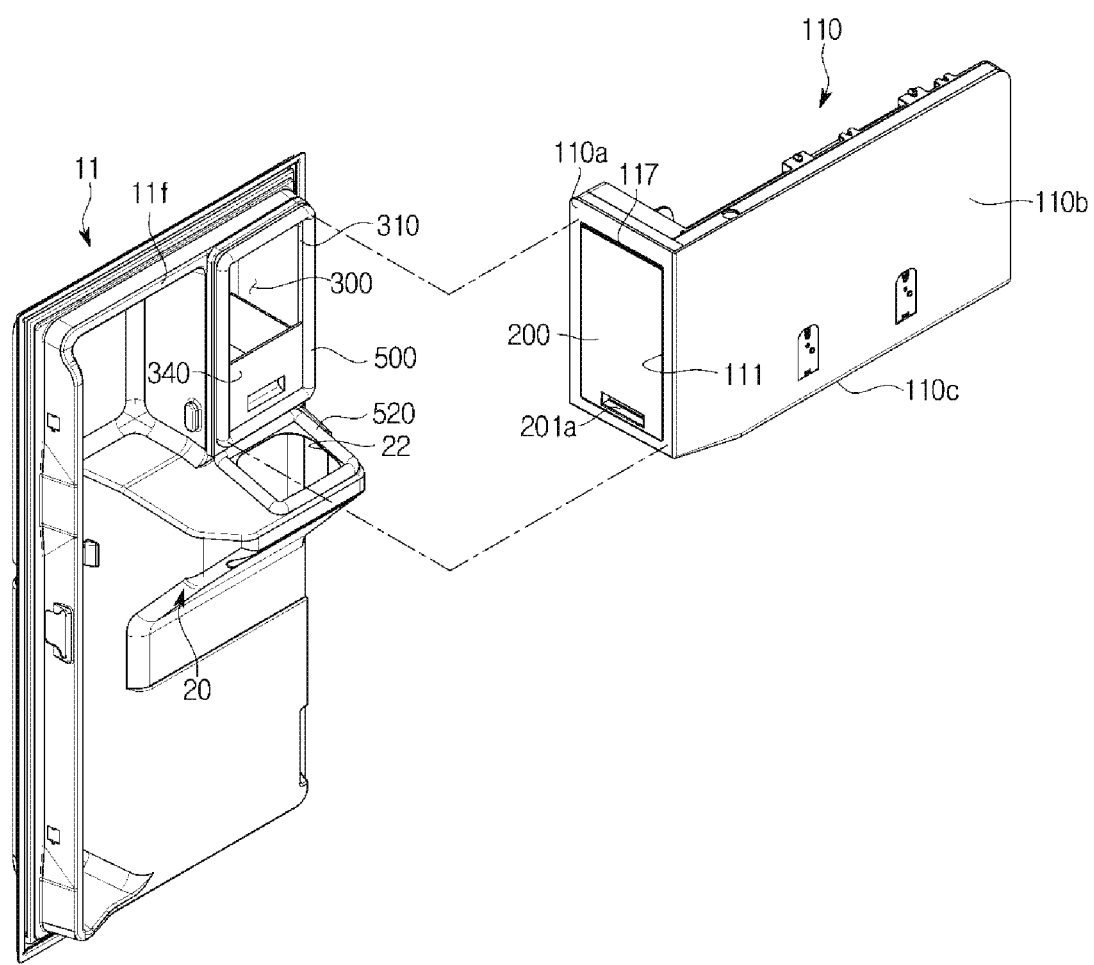
FIG. 7 illustrates a view showing an ice-making compartment, a space formed in a door and a sealing member according to one embodiment of the present disclosure.
Figure 8:
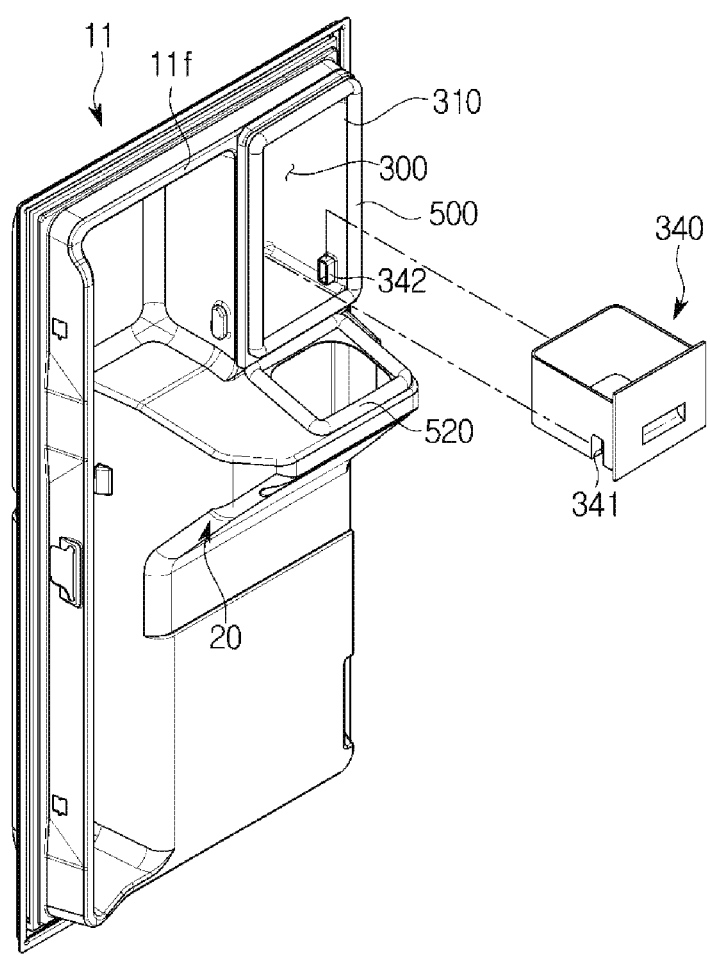
FIG. 8 illustrates a view showing a receiving member mounted in a space of a door according to one embodiment of the present disclosure.
Figure 9:
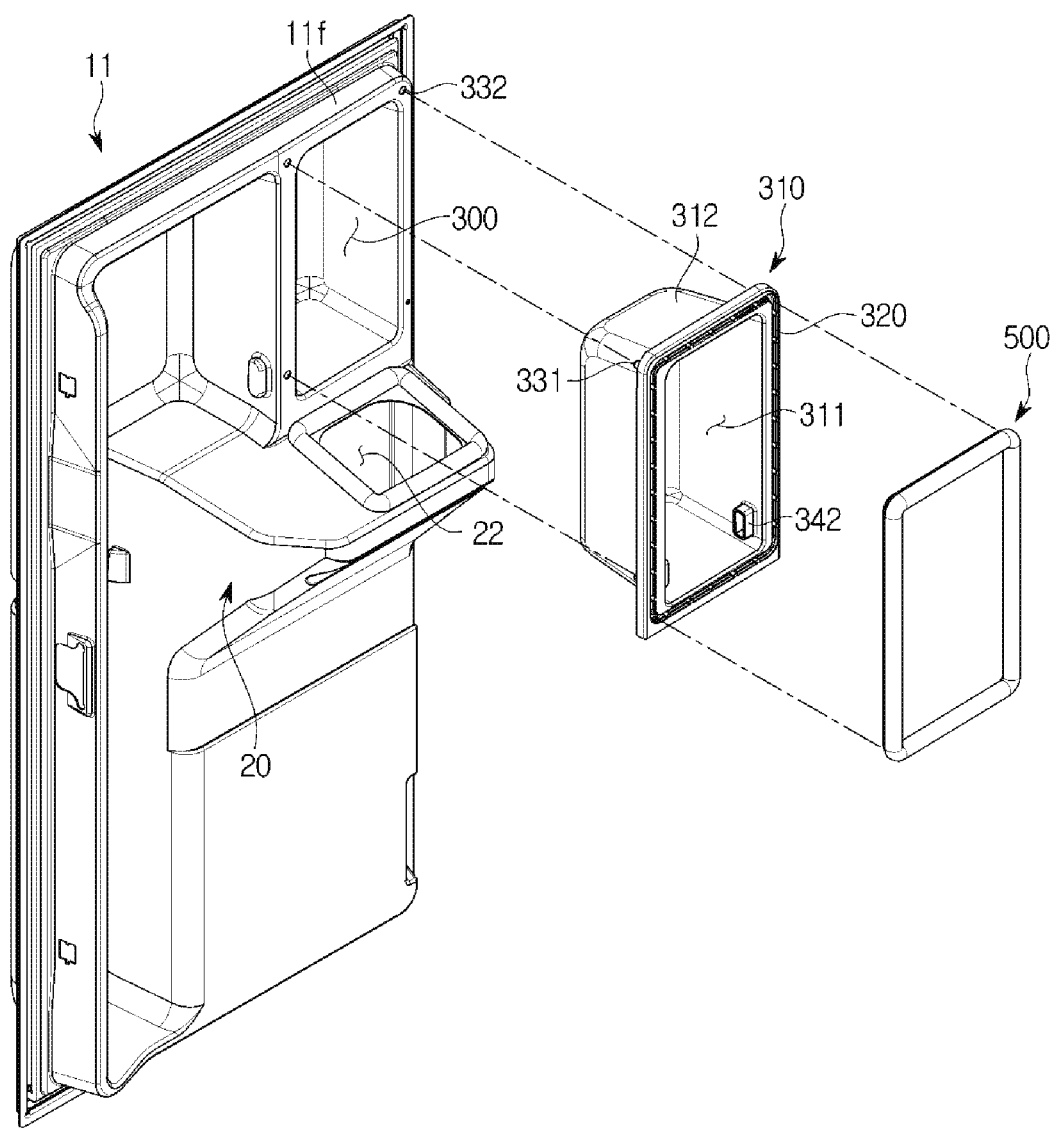
FIG. 9 illustrates an exploded perspective view showing a cool air inflow housing installed in a space of a door and a sealing member according to one embodiment of the present disclosure.
Figure 10:
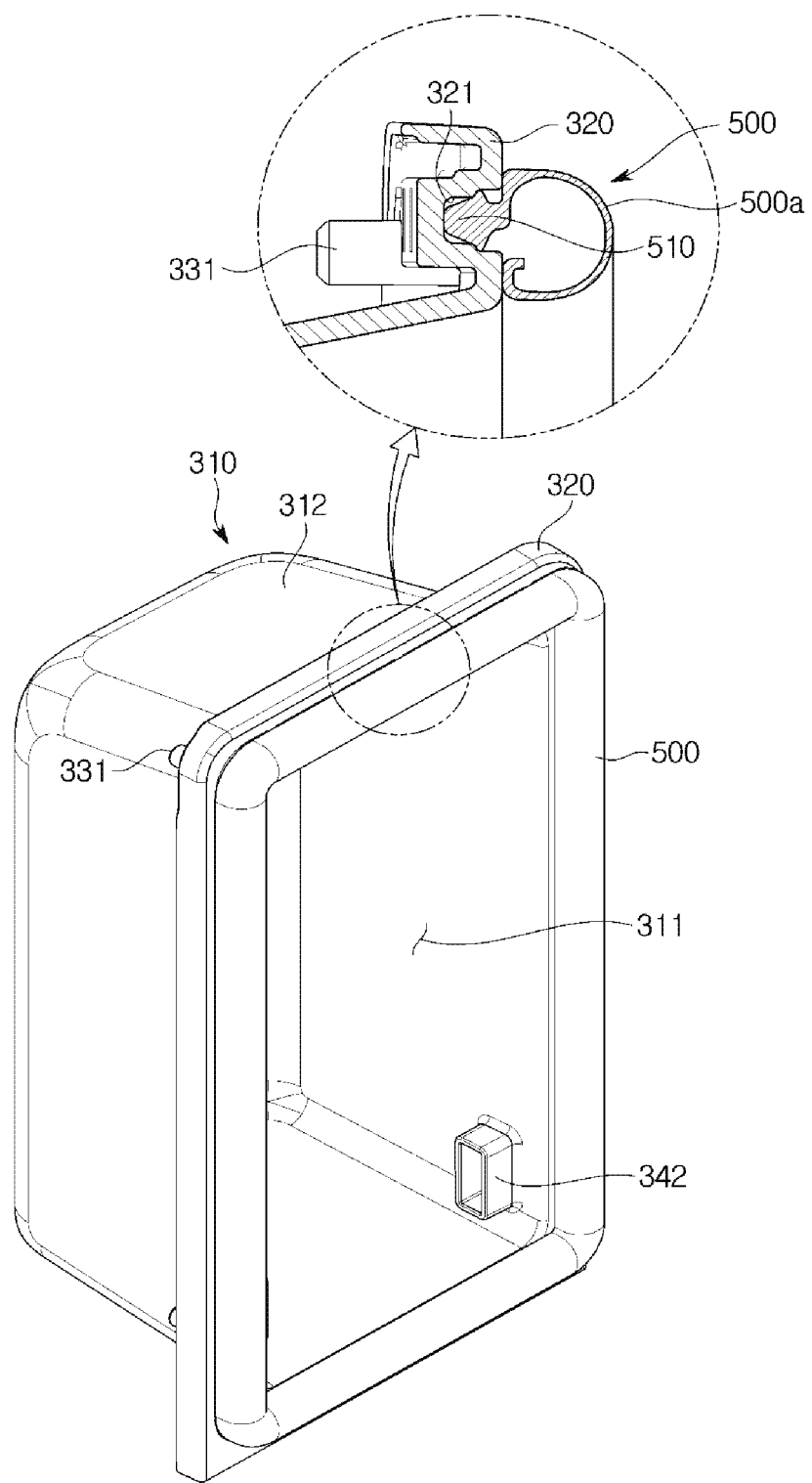
FIG. 10 illustrates a perspective view and a partially enlarged view showing a cool air inflow housing mounted with a sealing member according to one embodiment of the present disclosure.

FIG. 7 illustrates a view showing an ice-making compartment, a space formed in a door and a sealing member according to one embodiment of the present disclosure. FIG. 8 illustrates a view showing a receiving member mounted in a space of a door according to one embodiment of the present disclosure. FIG. 9 illustrates an exploded perspective view showing a cool air inflow housing installed in a space of a door and a sealing member according to one embodiment of the present disclosure. FIG. 10 illustrates a perspective view and a partially enlarged view showing a cool air inflow housing mounted with a sealing member according to one embodiment of the present disclosure.

As shown in FIGS. 7 to 10, the refrigerating compartment door 11 may include the space 300. The space 300 may be disposed in the refrigerating compartment door 11. The space 300 may be formed in a rear surface 11d of the refrigerating compartment door 11. The space 300 may be recessed in the rear surface 11d of the refrigerating compartment door 11. The space 300 may be formed by recessing at least a part of the rear surface 11d of the refrigerating compartment door 11. The space 300 may be formed at a position corresponding to the ice-making compartment 100. The space 300 may be formed to face the ice bucket 200 of the ice-making compartment 100. The space 300 may receive cool air of the ice-making compartment 100 through the cool air outlet 117 formed between the ice-making housing 110 and the ice bucket 200. The space 300 is configured so that a low temperature (0° C. or less) may be maintained by cool air of the ice-making compartment flowing through the cool air outlet 117. The space 300 may be maintained at a temperature (0° C. or less) lower than the temperature of the refrigerating compartment 10a due to cool air transferred from the ice-making compartment. The space 300 maintained at a low temperature may store food or an article requiring storage at a temperature lower than the temperature of the refrigerating compartment 10a and higher than the temperature of the freezing compartment 10b.

A sealing member 500 is disposed between the space 300 of the refrigerating compartment door 11 and the ice-making compartment 100.

The sealing member 500 is configured to seal between the space 300 of the refrigerating compartment door 11 and the ice-making compartment 100 when the refrigerating compartment door 11 is closed. The sealing member 500 is configured to seal an outer side of the ice bucket mounting hole 111 when the refrigerating compartment door 11 is closed.

The sealing member 500 may be configured to prevent cool air from escaping from the ice-making compartment 100. The sealing member 500 may be configured to prevent cool air from escaping from the ice-making housing 110 and the ice bucket 200.

The sealing member 500 may be disposed at an outer edge of the space 300. The cool air outlet 117 formed at the outer side of the ice bucket mounting hole 111 of the ice-making housing 110 may communicate with the space 300 when the refrigerating compartment door 11 is closed. The cool air of the ice-making compartment 100 may flow into the space 300 through the cool air outlet 117. Here, the cool air may be prevented from escaping to the outside of the space 300 by the sealing member 500.

Further, the space 300 formed in the refrigerating compartment door 11 may include a cool air inflow housing 310. The cool air inflow housing 310 may be installed at the space 300 formed in the rear surface 11d of the refrigerating compartment door 11. The cool air inflow housing 310 may have a form corresponding to the space 300 to be inserted into the space 300 of the refrigerating compartment door 11. The cool air inflow housing 310 may include a receiving groove 311 inserted into the space 300 so as to receive cool air moved from the ice-making compartment 100. The cool air inflow housing 310 includes a housing body 312 in which the receiving groove 311 is formed so as to be inserted into the space 300 of the refrigerating compartment door 11, and a sealing member coupling portion 320 formed to couple the sealing member 500 at the edge of the housing body 312.

The housing body 312 may be formed in a hexahedron shape having an opened front face. The receiving groove 311 configured to accommodate cool air may be formed inside the housing body 312. The sealing member coupling portion 320 to which the sealing member 500 is coupled, is formed at the front edge of the housing body 312.

A receiving member 340 may be coupled to the cool air inflow housing 310. The receiving member 340 is configured to accommodate low-temperature food, a cosmetic or the like. A receiving member mounting groove 341 may be formed in a receiving member 340. A receiving member mounting portion 342 for allowing the receiving member 340 to be mounted thereon may be disposed in the receiving groove 311 of the cool air inflow housing 310. The receiving member mounting portion 342 is formed to protrude from both sides of the receiving groove 311. The receiving member mounting groove 341 may be formed in a shape corresponding to the receiving member mounting portion 342. In the embodiment of the present disclosure, the receiving member 340 has a drawer shape, but the spirit of the present disclosure is not limited thereto. For example, the receiving member 340 may include a guard and the like. The cool air inflow housing 310 includes a first fixing portion 331 formed for fixing the space 300. The first fixing portion 331 may include a protrusion formed to protrude from a rear surface of the sealing member coupling portion 320. A second fixing portion 332 corresponding to the first fixing portion 331 may be formed in the rear surface 11d of the refrigerating compartment door 11. The second fixing portion 332 may be formed outside the space 300. The second fixing portion 332 may include a groove shape corresponding to the first fixing portion 331. In the embodiment of the present disclosure, the first fixing portion and the second fixing portion are a protrusion and a groove, respectively, but the spirit of the present disclosure is not limited thereto. For example, the first fixing portion and the second fixing portion may include a fixing structure such as a screw or a hook.

The sealing member coupling portion 320 of the cool air inflow housing 310 may include a coupling groove 321 formed in a front edge thereof so that the sealing member 500 is coupled thereto. The coupling groove 321 may be formed in all edges of the sealing member coupling portion 320.

The sealing member 500 may include a rectangular ring shape. The sealing member 500 may be larger than the ice bucket mounting hole 111 so as to surround an outer side of the ice bucket mounting hole 111 of the ice-making housing 110. The sealing member 500 may include a contact surface 500a so as to seal the ice-making housing 110 and the ice-making compartment 100. A coupling protrusion 510 may protrude from a rear side of the contact surface 500a to be coupled to the coupling groove 321 of the sealing member coupling portion 320. The coupling protrusion 510 of the sealing member 500 may be formed in a shape corresponding to the coupling groove 321 of the sealing member coupling portion 320. In the embodiment of the present disclosure, the coupling protrusion 510 of the sealing member 500 is formed in a hook shape and the coupling groove 321 of the sealing member coupling portion 320 is formed in the shape of a hook groove, but various coupling structures capable of coupling the sealing member to the cool air inflow housing 310 may be adopted.

The dispenser 20 may further include a gasket 520 disposed at the ice inlet 22. The gasket 520 may be mounted on an edge of the ice inlet 22. The gasket 520 may be positioned corresponding to the first ice outlet 401 of the ice-making housing 110.

The gasket 520 may be disposed on an outer edge of the ice inlet 22 of the dispenser 20.

Figure 11:
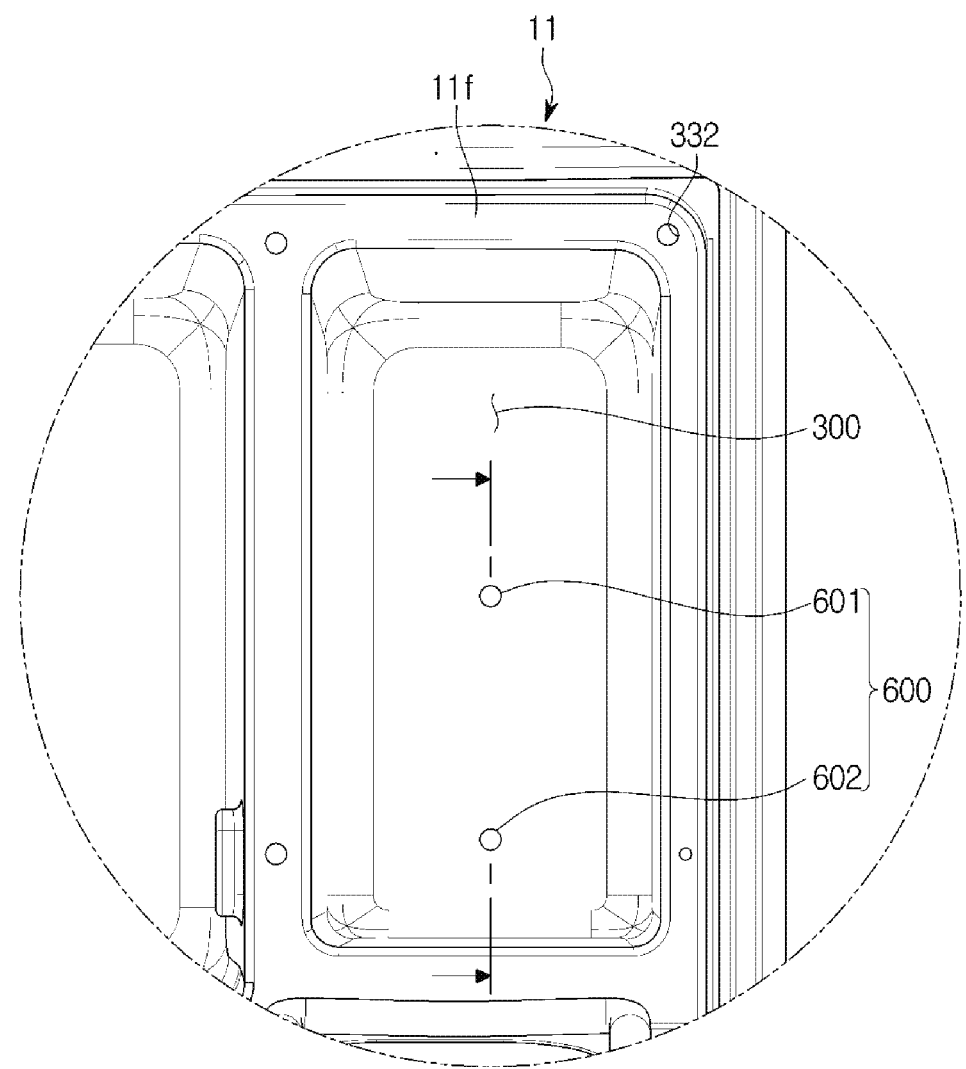
FIGS. 11 to 12 illustrate views showing a state in which a door is coupled with a cool air inflow housing according to one embodiment of the present disclosure.
Figure 12:
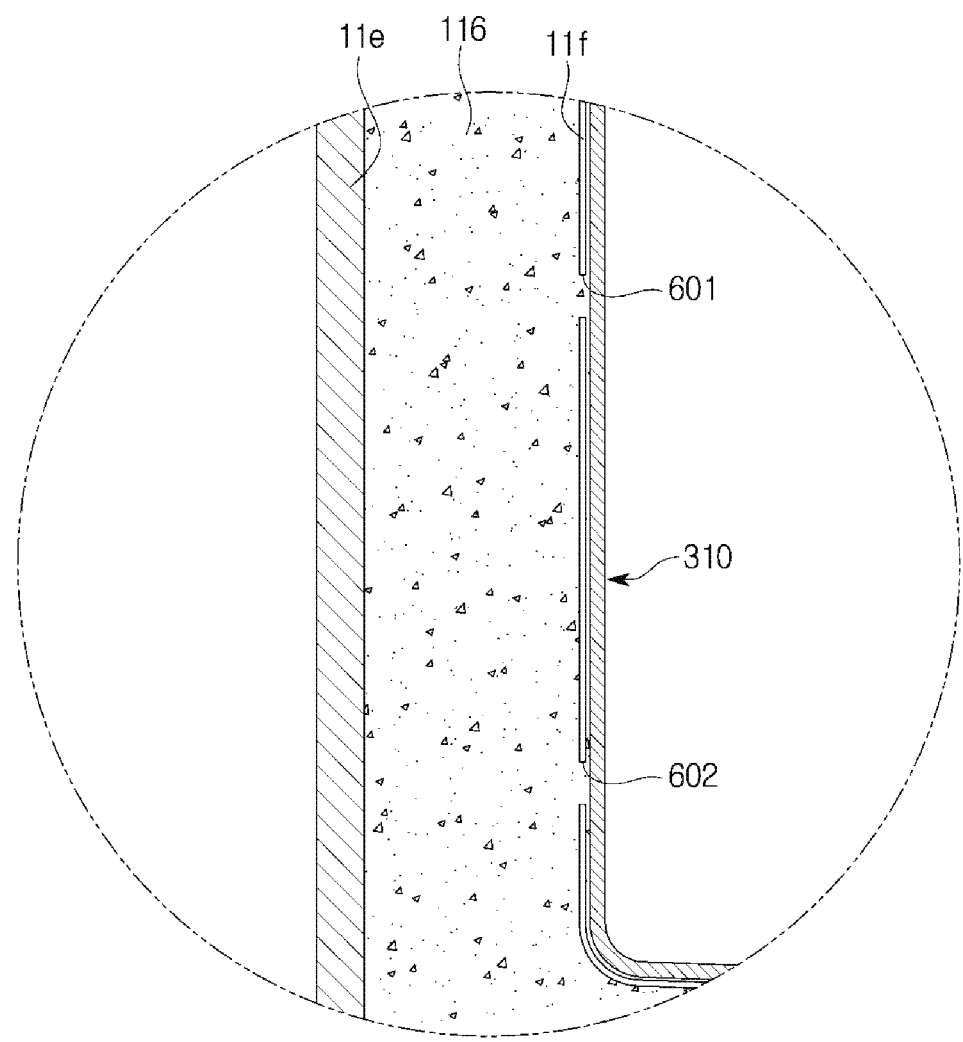

FIGS. 11 to 12 illustrate views showing a state in which the door is coupled with the cool air inflow housing according to one embodiment of the present disclosure.

As shown in FIGS. 11 to 12, the cool air inflow housing 310 may be coupled to the refrigerating compartment door 11.

The refrigerating compartment door 11 may include a door outer case 11e forming an outer surface and a door inner case 11f forming an inner surface. The space 300 may be recessed into the door inner case 11f. The insulating material 116 may be foamed between the door outer case 11e and the door inner case 11f.

The cool air inflow housing 310 may be inserted into the space 300 of the refrigerating compartment door 11 and assembled. The cool air inflow housing 310 may be assembled at the door inner case 11f and coupled by foaming of the insulating material.

One or more foaming holes 600 may be formed in the space 300 of the door inner case 11f. The foaming holes 600 may include a first foaming hole 601 positioned at a center of the space 300 and a second foaming hole 602 positioned at a lower side and separated from the first foaming hole 601.

The cool air inflow housing 310 may be fixed by foaming the heat insulating material 116 through the first foaming hole 601 and the second foaming hole 602 of the door inner case 11f in a state where the cool air inflow housing 310 is inserted into the door inner case 11f.

Therefore, the cool air inflow housing 310 may be in direct contact with and fixed to the door inner case 11f to achieve a sense of unity with the refrigerating compartment door 11 and improve durability.

Figure 13:
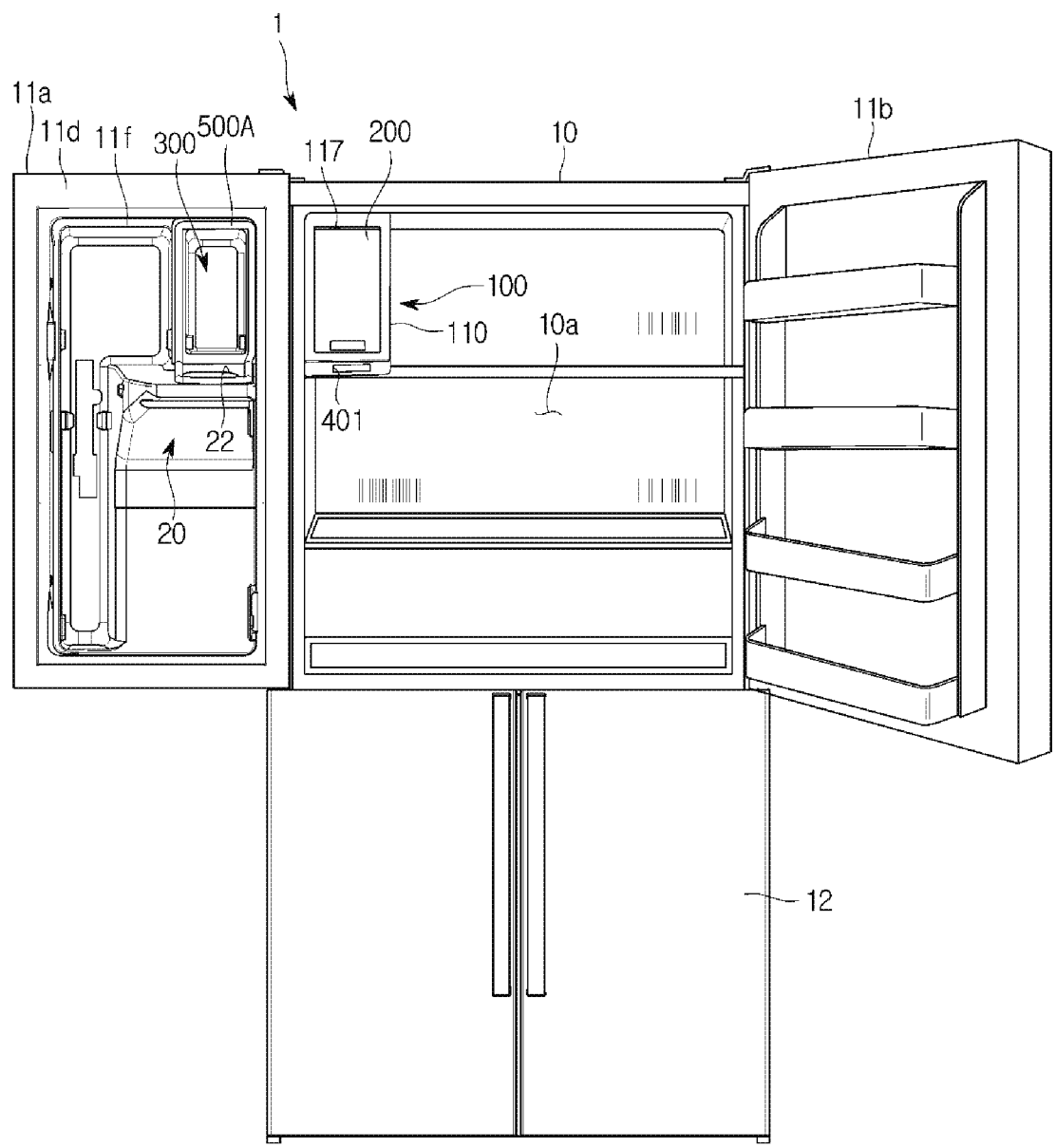
FIG. 13 illustrates a front view showing a sealing member disposed between a door and an ice-making compartment of a refrigerator according to another embodiment of the present disclosure.
Figure 14:
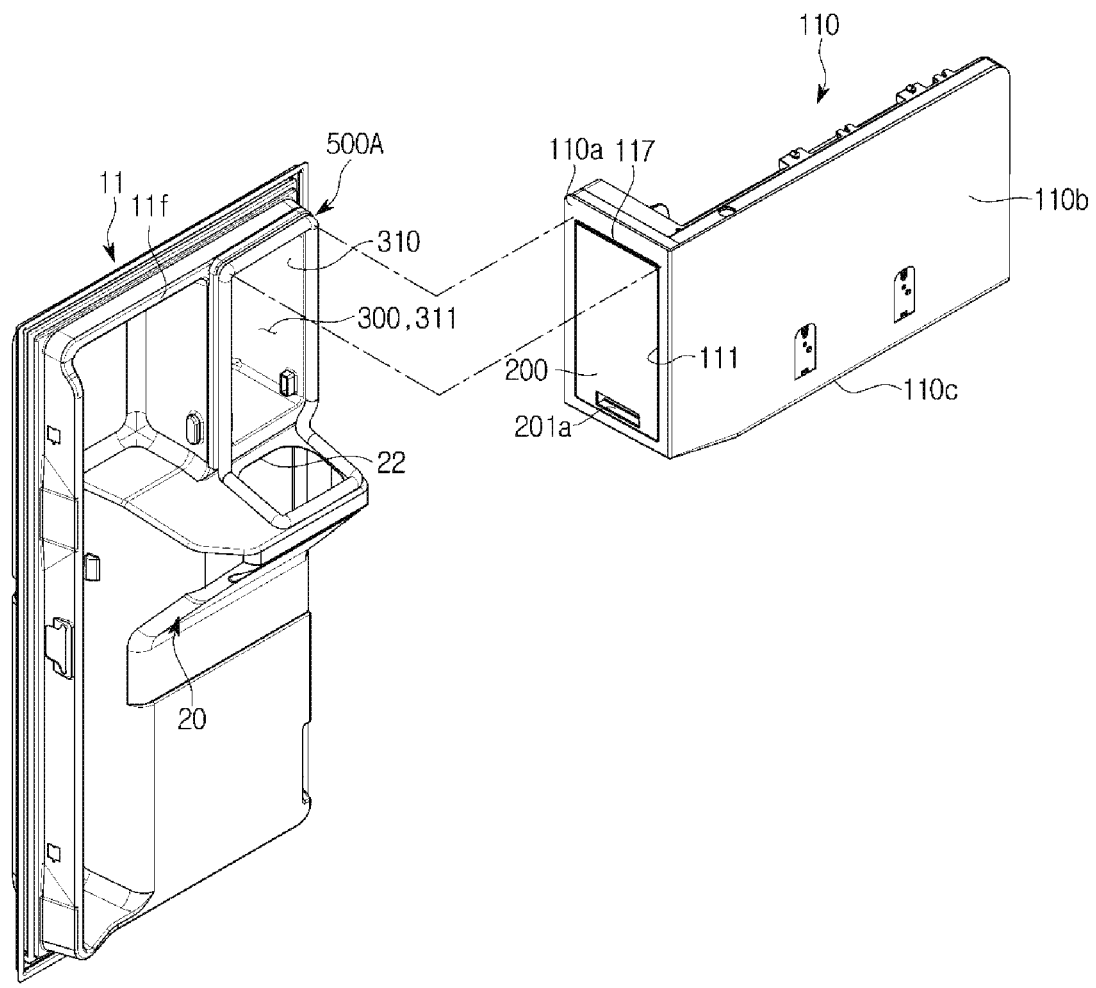
FIG. 14 illustrates a view showing an ice-making compartment, a cool air inflow housing disposed in a door, and a sealing member according to another embodiment of the present disclosure.

FIG. 13 illustrates a front view showing a sealing member disposed between a door and an ice-making compartment of a refrigerator according to another embodiment of the present disclosure. FIG. 14 illustrates a view showing an ice-making compartment, a cool air inflow housing disposed in a door, and a sealing member according to another embodiment of the present disclosure. For reference numerals not shown, refer to FIGS. 1 to 12.

As shown in FIGS. 13 to 14, a sealing member 500A is configured to prevent cool air from escaping from the ice-making compartment 100. The sealing member 500A may be configured to prevent cool air from escaping from the ice-making housing 110 and the ice bucket 200.

The sealing member 500A allows the cool air outlet 117 formed at an outer side of the ice bucket mounting hole 111 of the ice-making housing 110 to communicate with the space 300 when the refrigerating compartment doors 11 is closed. The cool air of the ice-making compartment 100 may flow into the space 300 through the cool air outlet 117. At this time, the cool air may not escape to the outside of the space 300 due to the sealing member 500A. The sealing member 500A is configured to prevent the cool air from escaping from the ice-making compartment 100.

The sealing member 500A may be formed in a shape capable of surrounding an outer edge of the space 300 formed in the refrigerating compartment door 11 and the ice inlet 22 of the dispenser 20.

The sealing member 500A may include a rectangular ring shape. The sealing member 500A is disposed at a corresponding position to surround the outer side of the ice bucket mounting hole 111 of the ice-making housing 110 and the first ice outlet 401.

Accordingly, when the refrigerating compartment door 11 is closed, the ice-making compartment 100 may be sealed by the refrigerating compartment door 11 and the sealing member 500A. The cool air of the ice-making compartment 100 flows into the space 300 of the refrigerating compartment door 11 through the cool air outlet 117 formed at the ice bucket mounting hole 111 of the ice-making housing 110.

Here, the space 300 may be maintained at a temperature (0° C. or less) lower than the temperature of the refrigerating compartment 10a due to cool air transferred from the ice-making compartment 100. The space 300 maintained at a low temperature may store food or an article requiring storage at a temperature lower than the temperature of the refrigerating compartment 10a and higher than the temperature of the freezing compartment 10b.

Since the detailed operation of the sealing member 500A according to the above-described structure may be sufficiently predicted from the above-described content, a repetitive description will be omitted.

Figure 15:
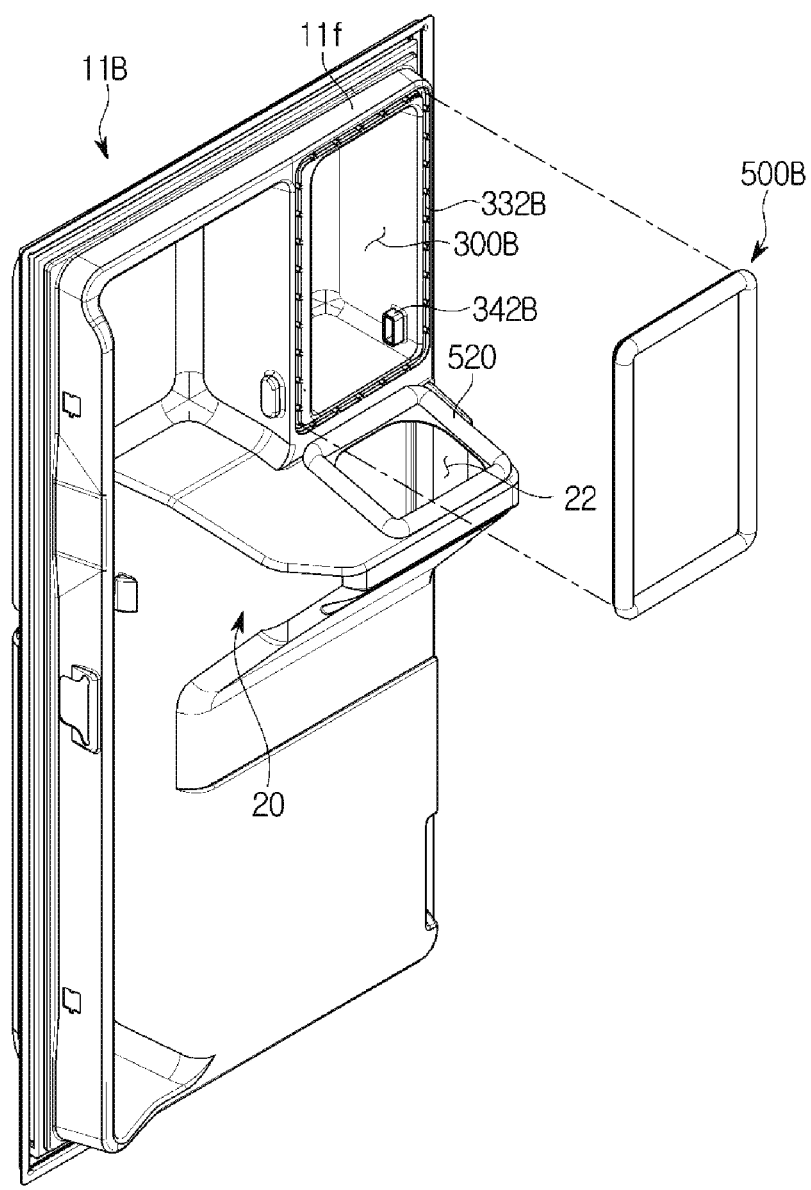
FIG. 15 illustrates an exploded perspective view showing a sealing member installed in a space of a door according to still another embodiment of the present disclosure.
Figure 16:
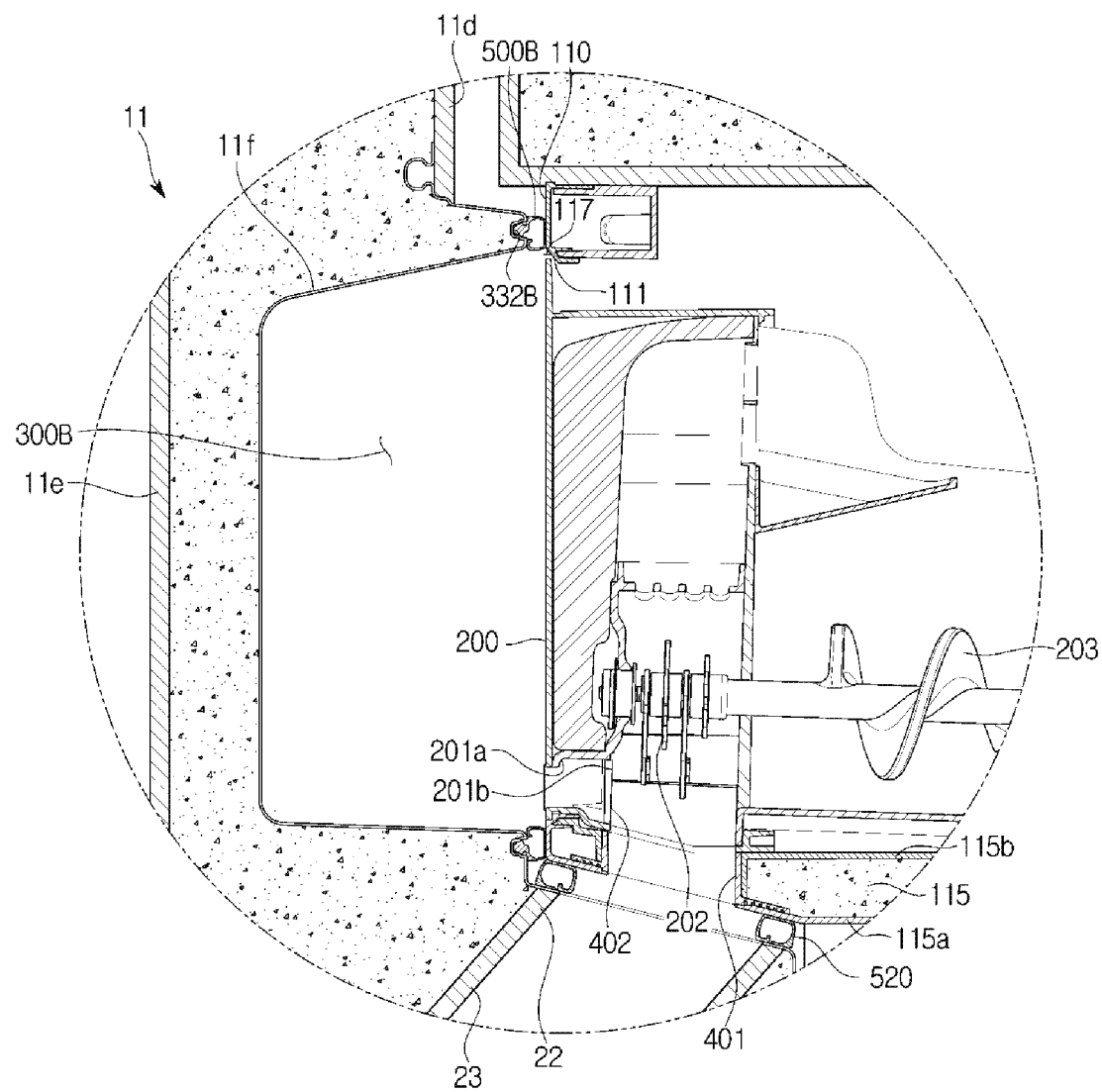
FIG. 16 illustrates a cross-sectional view showing a sealing member installed in a space of a door so as to correspond to an ice-making compartment according to still another embodiment of the present disclosure.

FIG. 15 illustrates an exploded perspective view showing a sealing member installed in a space of a door according to still another embodiment of the present disclosure. FIG. 16 illustrates a cross-sectional view showing a sealing member installed in a space of a door to correspond to an ice-making compartment according to still another embodiment of the present disclosure. For reference numerals not shown, refer to FIGS. 1 to 14.

As shown in FIGS. 15 to 16, the refrigerating compartment door 11 may include a space 300B. The space 300B may be integrally formed in the door inner case 11f of the refrigerating compartment door 11. The space 300B may be recessed into the door inner case 11f.

The space 300B may communicate with the cool air outlet 117 formed at the outer side of the ice bucket mounting hole 111 of the ice-making housing 110. The cool air of the ice-making compartment 100 may flow into the space 300B through the cool air outlet 117 when the refrigerating compartment door 11 is closed.

The sealing member 500B may be coupled to the space 300B. The sealing member 500B may be formed at a position corresponding to the ice-making compartment 100. The sealing member 500B is configured to apply a sealing force to the ice-making compartment 100 when the refrigerating compartment door 11 is closed. The sealing member 500B allows the cool air of ice-making compartment 100 to flow into the space 300B of the refrigerating compartment door 11 through the cool air outlet 117 formed at the ice bucket mounting hole 111 of the ice-making housing 110 when the refrigerating compartment door 11 is closed.

The space 300B may be maintained at a temperature (0° C. or less) lower than the temperature of the refrigerating compartment 10a due to cool air transferred from the ice-making compartment. The space 300B maintained at a low temperature may store food or an article requiring storage at a temperature lower than the temperature of the refrigerating compartment 10a and higher than the temperature of the freezing compartment 10b.

Further, the cool air may not escape to the outside of the space 300B due to the sealing member 500B. The sealing member 500B is configured to prevent the cool air from escaping from the ice-making compartment 100.

Further, a seal member coupling portion 323B allowing the sealing member 500B to be coupled thereto may be formed in the door inner case 11f. The sealing member coupling portion 323B may be formed in the outer edge of the space 300B. The sealing member coupling portion 323B may be formed in a shape corresponding to the first fixing portion 331 of the sealing member 500B. The sealing member coupling portion 332B may include a groove shape corresponding to the first fixing portion 331. In the embodiment of the present disclosure, the sealing member 500B is a groove corresponding to a protrusion in a hook shape, but the spirit of the present disclosure is not limited thereto.

Figure 17:
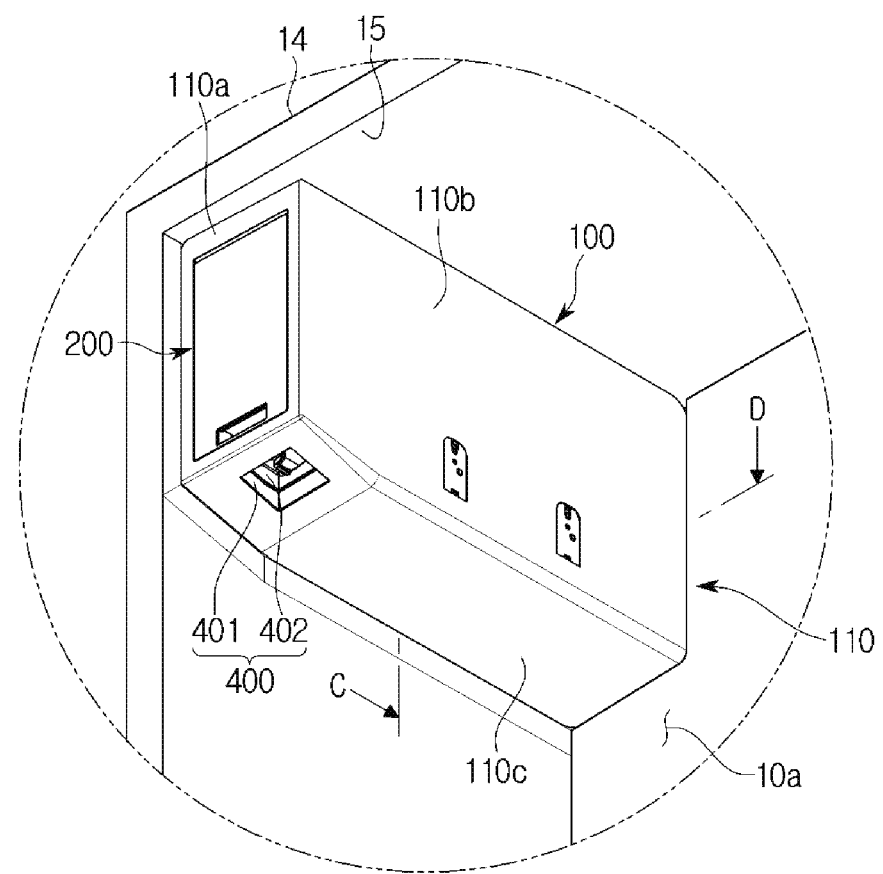
FIG. 17 illustrates a perspective view showing an ice-making compartment installed in a refrigerating compartment according to still another embodiment of the present disclosure.
Figure 18:
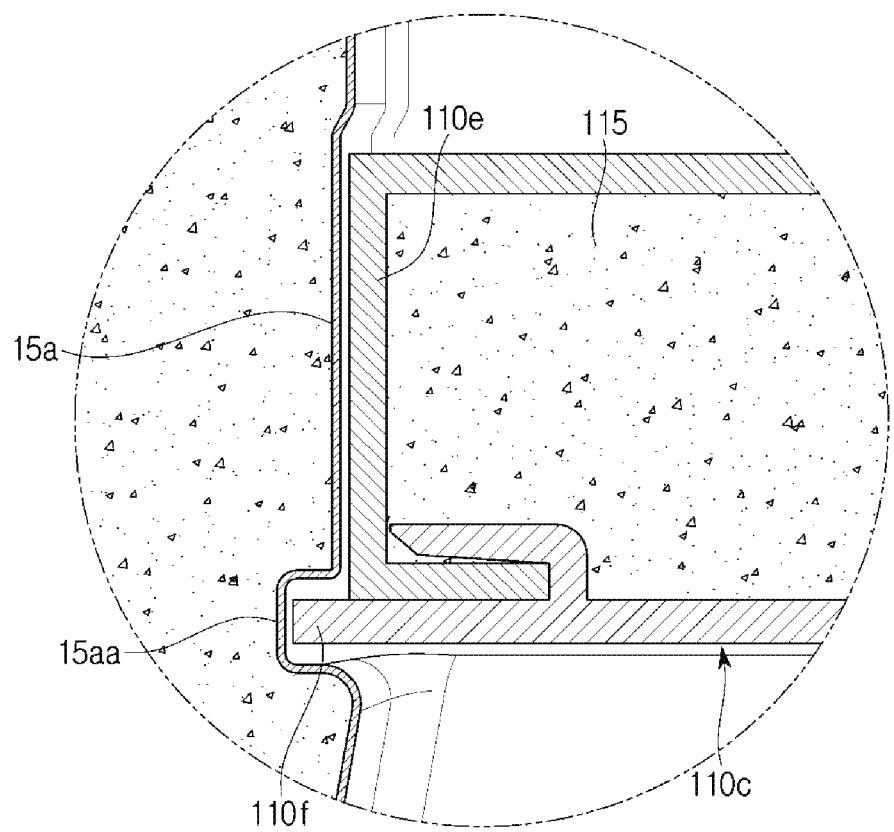
FIG. 18 illustrates a cross-sectional view of a portion C of FIG. 17 according to an embodiment of the present disclosure.
Figure 19:
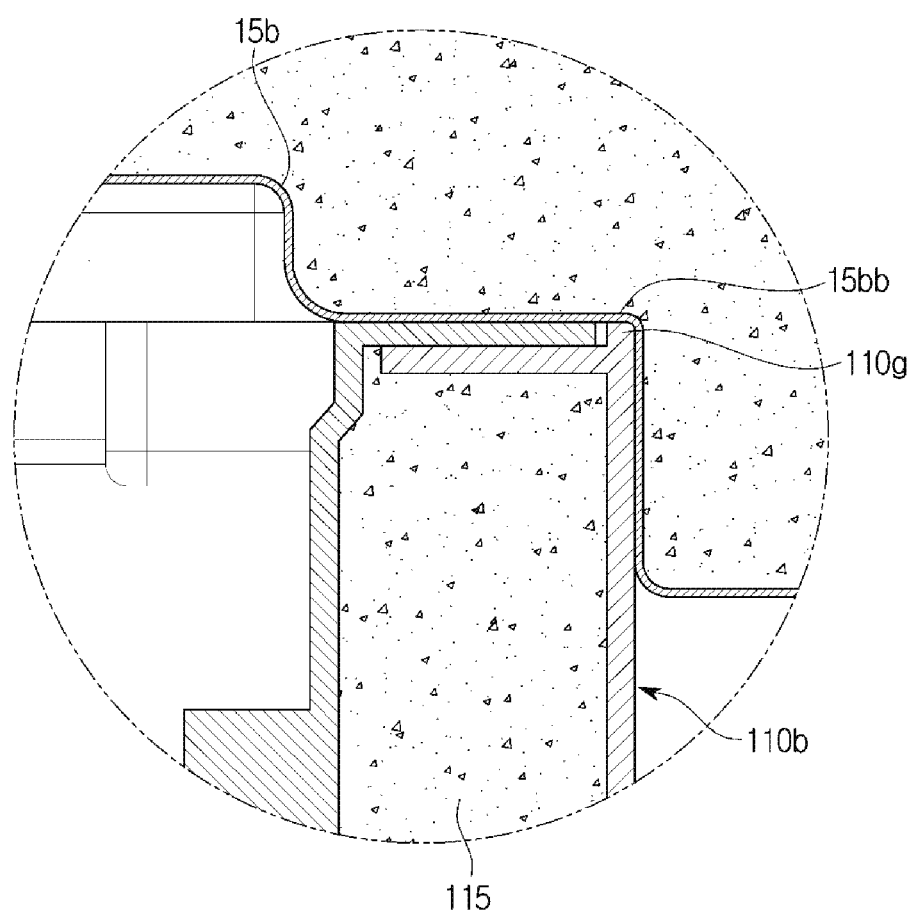
FIG. 19 illustrates a cross-sectional view of a portion D of FIG. 17 according to an embodiment of the present disclosure.
Figure 20:
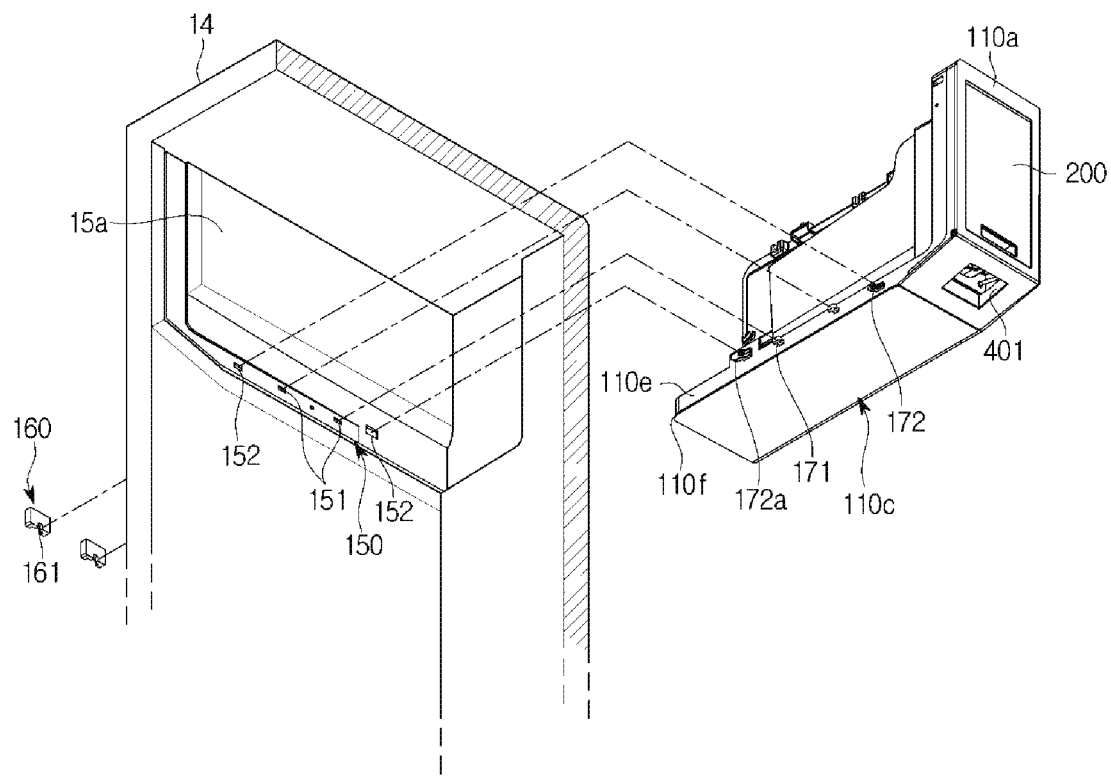
FIGS. 20 to 23 illustrate views showing a method of installing an ice-making housing according to still another embodiment of the present disclosure.
Figure 21:
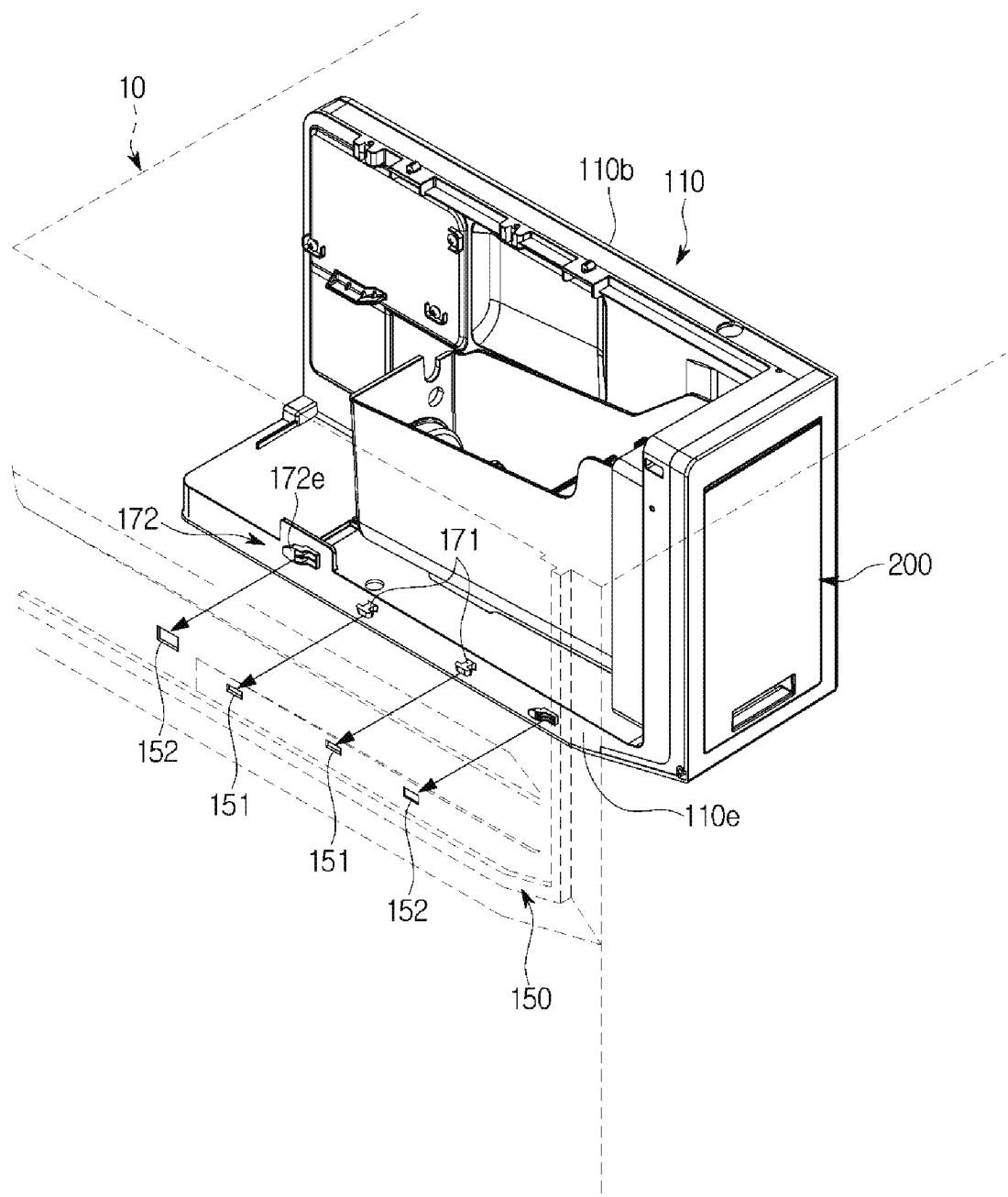
Figure 22:
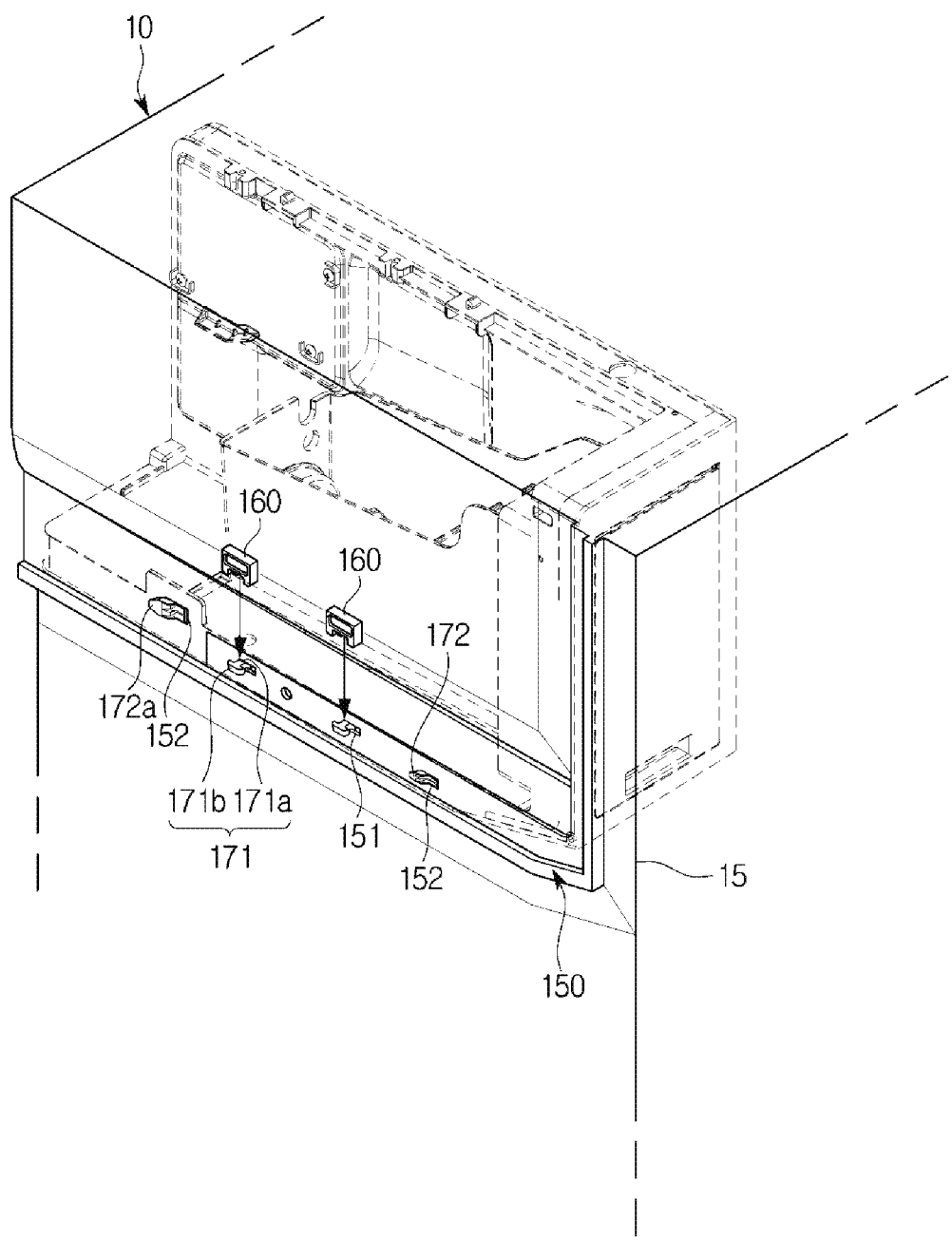
Figure 23:
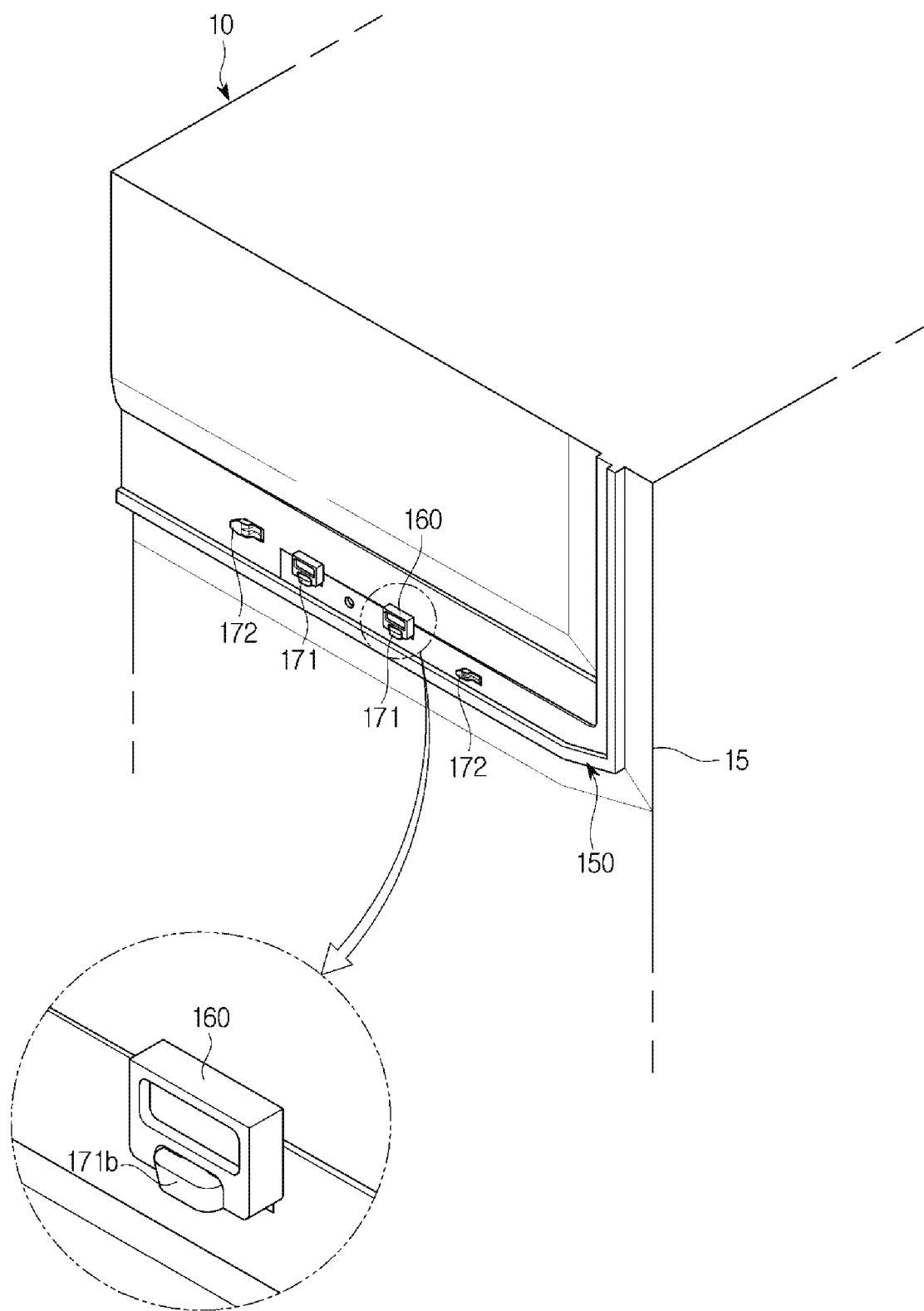

FIG. 17 illustrates a perspective view showing an ice-making compartment installed in a refrigerating compartment according to still another embodiment of the present disclosure, FIG. 18 illustrates a cross-sectional view of a portion C of FIG. 17 according to an embodiment of the present disclosure, and FIG. 19 illustrates a cross-sectional view of a portion D of FIG. 17 according to an embodiment of the present disclosure.

As shown in FIGS. 17 to 19, the ice-making compartment 100 may be disposed in the refrigerating compartment 10a. The ice-making compartment 100 may be coupled to the inner case 15 of the refrigerating compartment 10a. The inner case 15 of the refrigerating compartment 10a may include an inner case side surface 15a forming an inner side surface of the refrigerating compartment 10a, and an inner case rear surface 15b connected to the inner case side surface 15a and forming an inner rear surface of the refrigerating compartment 10a.

The inner case 15 of the refrigerating compartment 10a may include one or more seating portions 15aa and 15bb formed to be bent. The first seating portion 15aa may be formed in the inner case side surface 15a. The second seating portion 15bb may be formed in the inner case rear surface 15b. The first seating portion 15aa and the second seating portion 15bb may be formed to reinforce the rigidity of the inner case 15 of the refrigerating compartment 10a.

Further, the first seating portion 15aa and the second seating portion 15bb of the inner case 15 are configured to improve the airtightness when assembled with the ice-making housing 110.

The ice-making housing 110 may be fixedly in contact with the inner case 15 of the refrigerating compartment 10a. The ice-making housing 110 may include a front panel 110a, a bottom panel 110c, and a side panel 110b. An example in which the side panel 110*b* of the ice-making housing 110 is positioned at a right side will be described.

In the embodiment of the present disclosure, the ice-making housing 110 is disposed at a left upper end of the refrigerating compartment 10*a*, and the side panel 110*b* of the ice-making housing is positioned at a right side accordingly. However, the spirit of the present disclosure is not limited thereto. For example, the ice-making housing may be coupled to a right side of the refrigerating compartment. Here, the side surface may be positioned at a left side.

Further, the bottom panel 110*c* of the ice-making housing 110, which is coupled to the inner case side surface 15*a* of the refrigerating compartment 10*a*, may include a first forming portion 110*f*. At least a portion of the bottom panel 110*c* may include the first forming portion 110*f*. A first coupling surface 110*e* (see FIG. 20) forming a part of the bottom panel 110*c* may include the first forming portion 110*f*. The first forming portion 110*f* may be formed to correspond to the first seating portion 15*aa* of the inner case side surface 15*a*. The first forming portion 110*f* may be formed in a shape and size corresponding to the first seating portion 15*aa* of the inner case side surface 15*a*. The first forming portion 110*f* may be inserted into the first seating portion 15*aa* of the inner case side surface 15*a* so that the ice-making housing 110 may be brought into tight contact with the inner case side surface 15*a*.

Further, the side panel 110*b* of the ice-making housing 110, which is coupled to the inner case rear surface 15*b* of the refrigerating compartment 10*a*, may include a second forming portion 110*g* formed at a rear end thereof. The second forming portion 110*g* of the ice-making housing 110 may be formed to correspond to the second seating portion 15*bb* of the inner case rear surface 15*b*. The second forming portion 110*g* may be formed in a shape and size corresponding to the second seating portion 15*bb* of the inner case rear surface 15*b*. The second forming portion 110*g* may be inserted into the second seating portion 15*bb* of the inner case rear surface 15*b* so that the ice-making housing 110 may be brought into tight contact with the inner case rear surface 15*b*. Accordingly, it is possible to improve the airtightness of the ice-making compartment 100 and improve loosening of the outer appearance of the ice-making housing 110.

FIGS. 20 to 23 illustrate views showing a method of installing an ice-making housing according to still another embodiment of the present disclosure.

As shown in FIGS. 20 to 23, a structure and a method for installing the ice-making housing 110 on the inner case side surface 15*a* of the refrigerating compartment 10*a* will be described.

An ice-making housing mounting portion 150 for installing the ice-making housing 110 is formed in the inner case side surface 15*a* of the refrigerating compartment 10*a*. The ice-making housing mounting portion 150 may be formed at a position corresponding to the ice-making housing 110. The ice-making housing mounting portion 150 may include a first fixing hole 151 and a second fixing hole 152. Each of the first fixing hole 151 and the second fixing hole 152 may formed as one or a plurality of holes. In the embodiment of the present disclosure, a pair of first fixing holes 151 and a pair of second fixing holes 152 are disposed at a predetermined distance from each other, but the spirit of the present disclosure is not limited thereto. For example, the first fixing holes and the second fixing holes may be a plurality of holes.

The first fixing hole 151 and the second fixing hole 152 may have different sizes. Each of the second fixing holes 152 may be disposed on one side and the other side of the first fixing holes 151, respectively. In the embodiment of the present disclosure, the second fixing holes 152 are disposed at outer sides of the first fixing holes 151, but the spirit of the present disclosure is not limited thereto.

A plurality of fixing protrusions 171 and 172 may be disposed on the bottom panel 110*c* of the ice-making housing 110. A first fixing protrusion 171 and a second fixing protrusion 172 respectively corresponding to the first fixing hole 151 and the second fixing hole 152 are formed on the first coupling surface 110*e* of the bottom panel 110*c*.

The first fixing protrusion 171 corresponds to the first fixing hole 151, and the second fixing protrusion 172 corresponds to the second fixing hole 152.

Here, the second fixing protrusion 172 includes a locking portion 172*a* formed to protrude in a rearward direction of the ice-making housing 110.

The first fixing protrusion 171 may include a first fixing portion 171*a* extending from the first coupling surface 110*e* and a second fixing portion 171*b* formed at an end of the first fixing portion 171*a*. The first fixing protrusion 171 may be formed in a substantially T shape. The first fixing portion 171*a* may have a first width t1, and the second fixing portion 171*b* may have a second width t2. The second fixing portion 171*b* may be larger than the first fixing portion 171*a*. The first width t1 of the first fixing portion 171*a* is smaller than the second width t2 of the second fixing portion 171*b*.

Further, a fixer 160 configured to fix the first fixing protrusion 171 may be coupled to the first fixing portion 171*a* of the first fixing protrusion 171. The fixer 160 includes a fixer groove 161 having a shape corresponding to the first fixing portion 171*a*. The fixer groove 161 may have a size corresponding to the first width t1.

Accordingly, the ice-making housing 110 is positioned to correspond to the ice-making housing mounting portion 150 of the inner case side surface 15*a* of the refrigerating compartment 10*a*, and the first fixing protrusion 171 and the second fixing protrusion 172 of the first coupling surface 110*e* of the ice-making housing 110 are respectively inserted into the first fixing hole 151 and the second fixing hole 152.

Then, the ice-making housing 110 is moved to the inner case rear surface 15*b* side.

The second fixing protrusion 172 is inserted and moved into the second fixing hole 152 and the locking portion 172*a* is locked in the second fixing hole 152.

Further, the first fixing hole 151 is formed long in a longitudinal direction so that the first fixing protrusion 171 of the ice-making housing 110 is inserted thereinto and moved backward.

When the second fixing protrusion 172 is locked in the second fixing hole 152, the first fixing portion 171*a* of the first fixing protrusion 171 is fixed by the fixer groove 161 of the fixer 160. The fixing of the first fixing protrusion 171 and the fixer 160 may be implemented outside the inner case side surface 15*a* of the refrigerating compartment 10*a*. When the first fixing protrusion 171 is fixed by the fixer 160, the ice-making housing 110 may be firmly fixed by foaming between the outer case 14 and the inner case 15 of the refrigerating compartment 10*a*.

According to embodiments of the present disclosure, an insulating effect can be improved by the ice-making compartment with an improved structure.

Further, the cool air inflow chamber capable of maintaining a low temperature is formed inside the door, and thus a low temperature product can be stored.

Further, the gasket mounted onto the ice bucket cover is formed inside the door to reduce icing due to leakage of cool air of the ice-making compartment caused by an error in mounting the ice bucket, and the ice bucket installed in the ice-making compartment does not have a separate seal for preventing cool air leakage so that the structure can be simplified. Moreover, there is no need for a separate locking device or the like, and thus detachment can be facilitated.

Further, it is possible to improve an assembling property of the ice-making housing to improve the airtightness of the ice-making compartment, simplify a structure and improve durability.

Specific embodiments of the present disclosure have been illustrated and described above. However, the present disclosure is not limited to the aforementioned specific exemplary embodiments, and those skilled in the art may variously modify the disclosure without departing from the gist of the disclosure claimed by the appended claims within the scope of the claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator, comprising:
   a main body including a storage compartment;
   a door configured to open and close the storage compartment and including a space recessed in a rear side of the door;
   an ice-making compartment including:
      an ice-making housing disposed in the storage compartment,
      an ice bucket mounting hole formed at a front panel of the ice-making housing to allow an ice bucket to be introduced or withdrawn therethrough, and
      a cool air outlet formed between an upper inner surface of the ice bucket mounting hole and an upper end of an ice bucket cover for the ice bucket mounted in the ice bucket mounting hole, the ice-making compartment disposed in the storage compartment to align to the space of the door when the door is closed, wherein cool air flows through the cool air outlet from the ice-making compartment into the space of the door; and
   a seal disposed on the door and configured to prevent the cool air in the space and the ice bucket mounting hole from escaping outside of the space when the door is closed,
   wherein when the seal is in contact with the front panel of the ice-making housing, the seal is disposed outward of the cool air outlet to seal between the space of the door and the ice-making compartment and the cool air flows through the cool air outlet from the ice-making compartment into the space of the door.

2. The refrigerator according to claim 1, wherein the seal is disposed between the space and the ice-making compartment.

3. The refrigerator according to claim 2, further comprising:
   a cool air inflow housing formed on the space; and
   a seal coupling portion configured to couple the seal to the cool air inflow housing on the space recessed in the door.

4. The refrigerator according to claim 1, wherein the ice-making compartment includes:
   an ice maker configured to produce ice; and
   the ice bucket configured to store the ice produced in the ice maker.

5. The refrigerator according to claim 4, wherein the ice bucket mounting hole is formed to allow the ice bucket to be introduced or withdrawn.

6. The refrigerator according to claim 5, wherein the seal is aligned with an outer side of the ice bucket mounting hole when the door is closed.

7. The refrigerator according to claim 5, wherein cool air flows through the cool air outlet into the space.

8. The refrigerator according to claim 1, wherein:
   the door includes a refrigerating compartment door configured to open and close a refrigerating compartment in the storage compartment, and
   the space is disposed in the refrigerating compartment door.

9. The refrigerator according to claim 7, wherein the cool air of the ice-making compartment is moved to the space through the cool air outlet so that a temperature of the space is lower than the temperature of a refrigerating compartment.

10. The refrigerator according to claim 2, wherein the space further includes a cool air inflow housing.

11. The refrigerator according to claim 10, wherein the seal is disposed at the cool air inflow housing.

12. The refrigerator according to claim 5, wherein the ice-making compartment includes:
    a first ice outlet formed in the ice-making housing; and
    a second ice outlet formed in the ice bucket to align with the first ice outlet.

13. The refrigerator according to claim 10, wherein the seal is detachably mounted onto the cool air inflow housing.

14. A refrigerator, comprising:
    a main body including a refrigerating compartment and a freezing compartment;
    a door configured to open and close the refrigerating compartment and including a space recessed in a rear side of the door;
    an ice-making compartment including an ice-making housing disposed in the refrigerating compartment, an ice bucket mounting hole formed at a front panel of the ice-making housing to allow an ice bucket to be introduced or withdrawn therethrough, and a cool air outlet formed between an upper inner surface of the ice bucket mounting hole and an upper end of an ice bucket cover for the ice bucket mounted in the ice bucket mounting hole, the ice-making compartment disposed in the refrigerating compartment to align with the space of the door when the door is closed, wherein cool air flows through the cool air outlet from the ice-making compartment into the space of the door, wherein the space is recessed in the rear side of the door to align to the ice-making compartment;
    the ice bucket configured to store ice produced in the ice-making compartment; and
    a seal disposed between the space and the ice-making compartment and configured to seal the cool air in the space and the ice bucket mounting hole from escaping outside of the space when the door is closed,
    wherein when the seal is in contact with the front panel of the ice-making housing, the seal is disposed outward of the cool air outlet to seal between the space of the door and the ice-making compartment and the cool air flows through the cool air outlet from the ice-making compartment into the space of the door.

15. The refrigerator according to claim 14, wherein the seal is aligned with an outer side of the cool air outlet when the door is closed.

16. The refrigerator according to claim 14, wherein the seal is disposed at an end of the space.

\* \* \* \* \*